US009028788B2

(12) United States Patent
Kaneko et al.

(10) Patent No.: US 9,028,788 B2
(45) Date of Patent: *May 12, 2015

(54) POROUS SILICA MATERIAL AND OPTICAL MICROPHONE USING THE SAME

(75) Inventors: Yuriko Kaneko, Nara (JP); Takuya Iwamoto, Osaka (JP); Ushio Sangawa, Nara (JP); Masahiko Hashimoto, Osaka (JP); Norihisa Mino, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 321 days.

This patent is subject to a terminal disclaimer.

(21) Appl. No.: 13/598,886

(22) Filed: Aug. 30, 2012

(65) Prior Publication Data

US 2012/0321110 A1 Dec. 20, 2012

Related U.S. Application Data

(63) Continuation of application No. PCT/JP2011/006149, filed on Nov. 2, 2011.

(30) Foreign Application Priority Data

Nov. 5, 2010 (JP) .................................. 2010-248223

(51) Int. Cl.
*C01B 33/16* (2006.01)
*H04R 23/00* (2006.01)
*C01B 33/12* (2006.01)

(52) U.S. Cl.
CPC .................. *C01B 33/16* (2013.01); *C01B 33/12* (2013.01); *H04R 23/008* (2013.01)

(58) Field of Classification Search
CPC ........ C01B 33/12; C01B 33/16; H04R 23/008
USPC ......................................................... 423/335
See application file for complete search history.

(56) References Cited

U.S. PATENT DOCUMENTS

| 4,775,520 A | 10/1988 | Unger et al. |
| 2005/0139013 A1 | 6/2005 | Hashimoto et al. |

FOREIGN PATENT DOCUMENTS

| CN | 86106689 A | 5/1987 |
| JP | 61-018916 A | 1/1986 |
| JP | 2005-350519 A | 12/2005 |

(Continued)

OTHER PUBLICATIONS

Al-Oweini et al., "Surface Characterization by nitrogen adsorption of silica aerogels synthesized from various Si(OR)4 and R"Si(OR')3 precursors," Applied Surface Science 257 (2010) 276-281.*

(Continued)

*Primary Examiner* — Anthony J Zimmer
(74) *Attorney, Agent, or Firm* — Renner, Otto, Boisselle & Sklar, LLP

(57) ABSTRACT

A porous silica material in which silica particles are connected to one another three-dimensionally, wherein: the porous silica material includes a through hole including first pores smaller than a mean free path of an air, and second pores larger than the first pores; the porous silica material has a density of 100 kg/m$^3$ or more and 300 kg/m$^3$ or less; and an isobutyl group is bound to silicon of silica of the silica particles.

5 Claims, 18 Drawing Sheets

(56) References Cited

FOREIGN PATENT DOCUMENTS

| | | |
|---|---|---|
| JP | 2009-085868 A | 4/2009 |
| WO | WO 2009/010945 A2 | 1/2009 |

OTHER PUBLICATIONS

Fricke et al., "Aerogels: production, characterization, and applications," Thin Solid Films 297 (1997) 212-223.*

International Search Report for corresponding International Application No. PCT/JP2011/006149 mailed Feb. 21, 2012.

Form PCT-ISA-237 for corresponding International Application No. PCT/JP2011/006149 dated Feb. 21, 2012 and partial English translation.

Dudas et al., "Hybrid silica-porphyrin materials with tailored pore sizes", Materials Research Bulletin, Sep. 2010, vol. 45, Issue 9, pp. 1150-1156.

"Course on Sonics 8: Ultrasonic Wave", edited by Acoustical Society of Japan (edited by Nakamura, a professor of Tohoku University), pp. 28-29 and partial English translation (date unknown).

Website "Spectral Database for Organic Compounds, SDBS (National Institute of Advanced Industrial Science and Technology, an independent administrative agency)", http://riodb01.ibase.aist.go.jp/sdbs/cgi-bin/direct_frame_top.cgi and concise explanation(downloaded Aug. 2, 2012).

Nagahara et al., "Development of High-Sensitivity Ultrasonic Transducer in Air with Nanofoam Material", Japanese Journal of Applied Physics, vol. 44, No. 6B, pp. 4485-4489, 2005.

Chinese Search Report for corresponding Chinese Application No. 201180040135.5 dated Jul. 24, 2014.

\* cited by examiner

FIG.3
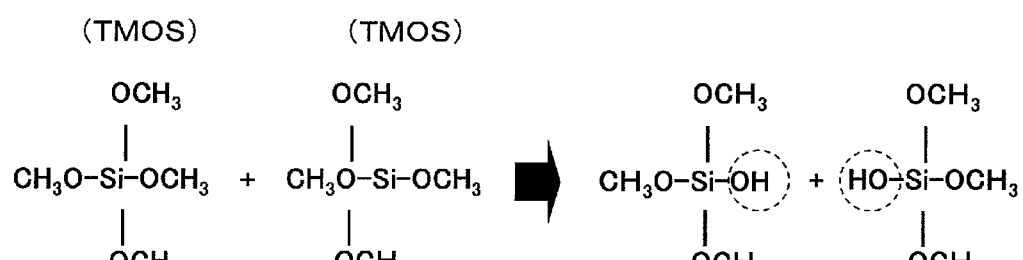
HYDROLYSIS (S1)
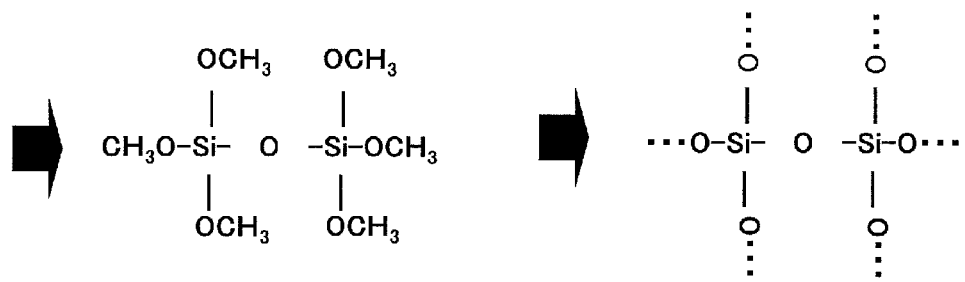
POLYCONDENSATION (S2)  GELATION (S3)

12 : 65.72ppm
13 : 25.36ppm
(in CDCl₃)

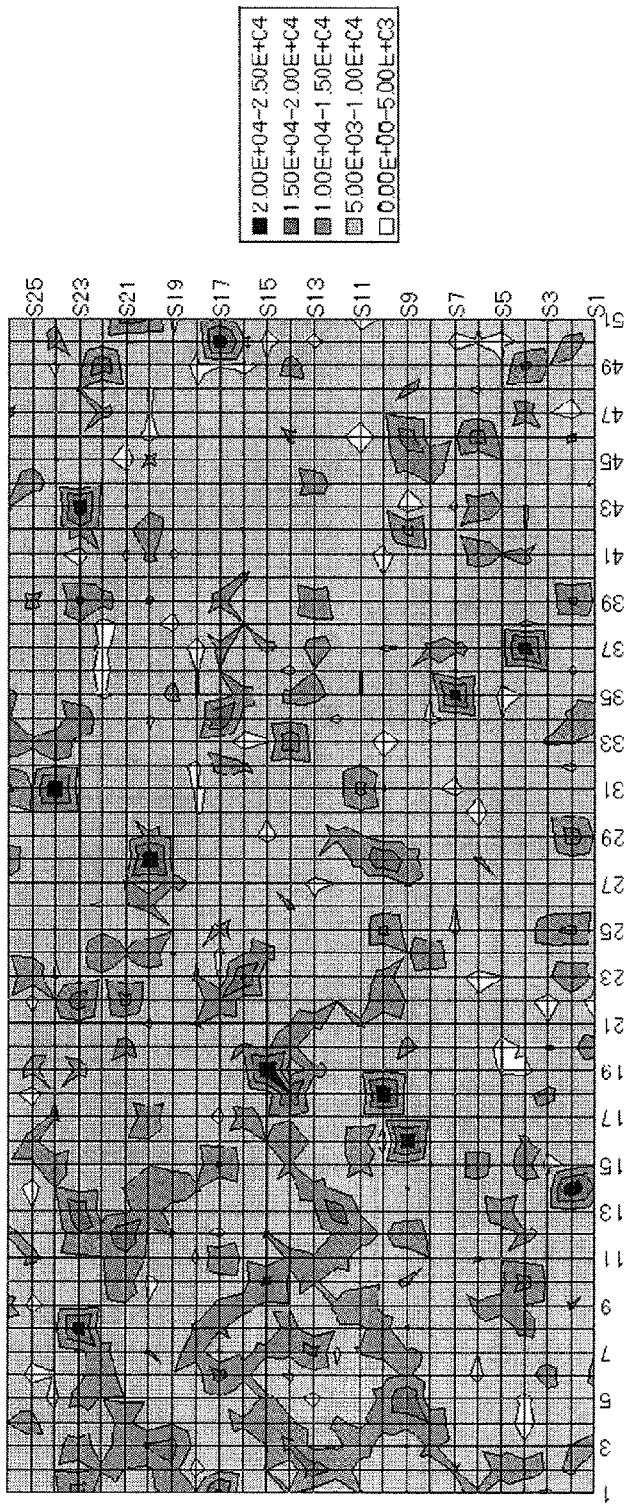
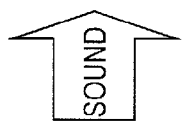
FIG.14

POROUS SILICA MATERIAL AND OPTICAL MICROPHONE USING THE SAME

This is a continuation of International Application No. PCT/JP2011/006149, with an international filing date of Nov. 2, 2011, which claims priority of Japanese Patent Application No. 2010-248223, filed on Nov. 5, 2010, the contents of which are hereby incorporated by reference.

BACKGROUND

1. Technical Field

The present application relates to a porous silica material used as an acoustic propagation medium, and an optical microphone.

2. Description of the Related Art

A low-density porous silica material, commonly referred to as "silica aerogel", has many pores and 90% by volume thereof consists of voids. The skeleton is formed by spherical silica particles of about some nm to some tens of nm connected together. A porous silica material has a low density and a low refractive index. The speed of sound propagating through a porous silica material is lower than the speed of sound through the air, i.e., 340 m/s. Therefore, it has been drawing attention as an acoustic propagation medium for various acoustic devices.

Conventionally, a porous silica material is manufactured by the following method. First, tetramethoxysilane (TMOS) represented by (Formula 1) below is mixed with a solvent such as ethanol to prepare a sol liquid.

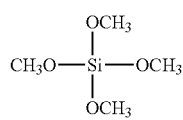

(Formula 1)

Next, catalytic water is added to the sol liquid, and allowed to undergo hydrolysis and polycondensation reaction, thereby producing a wet gel. Then, the solution in the wet gel is replaced with a gas (dried), thereby obtaining a porous silica material.

When replacing the solution in the wet gel with a gas, the gel structure will be destroyed if the tensile stress based on the surface tension of the solution remaining in the pores is greater than the strength of the gel. In order to prevent this, supercritical drying is often used in the step of drying the wet gel. Also, a porous silica material with very little aging can be obtained by subjecting the gel to a hydrophobization process.

A non-patent document, Hidetomo Nagahara, Takashi Hashida, Masa-aki Suzuki, Masahiko Hashimoto, "Development of High-Sensitivity Ultrasonic Transducer in Air with Nanofoam Material," Japanese Journal of Applied Physics, Vol. 44, No. 6B, pp. 4485-4489, 2005 discloses that a porous silica material is useful as an acoustic matching layer capable of efficiently taking in a sound wave, since the sound speed is low. It also discloses the relationship between the density of the porous silica material and the sound speed. As shown in FIG. 24, the lower the density, the lower the sound speed becomes.

Japanese Laid-Open Patent Publication No. 2009-85868 discloses an optical microphone as another application using a porous silica material. The optical microphone includes a photoacoustic propagation medium portion, and takes in a sound wave into the photoacoustic propagation medium portion to detect a distortion occurring in the photoacoustic propagation medium portion using light. Japanese Laid-Open Patent Publication No. 2009-85868 discloses that the photoacoustic propagation medium portion is suitable as the porous silica material.

SUMMARY

As described above, as the density of the porous silica material decreases, the sound speed lowers, and therefore the acoustic impedance as an acoustic matching layer decreases or the distortion in the photoacoustic propagation medium portion increases, whereby it is possible to improve the detection sensitivity, etc., of various acoustic devices. However, when the density of the porous silica material is decreased in order to lower the sound speed, there is a problem that the porous silica material becomes more brittle and fragile.

Particularly, when a porous silica material is used as an acoustic propagation medium of an acoustic device, it is beneficial to ensure a predetermined strength, and there is a problem that it is difficult to both improve the performance of the acoustic device and maintain the mechanical strength of the acoustic propagation medium.

One non-limiting, and exemplary embodiment provides a porous silica material having a density similar to, and a sound speed lower than, those of conventional porous silica materials, and an optical microphone using the same.

A porous silica material of the non-limiting, and exemplary embodiment is a porous silica material in which silica particles are connected to one another three-dimensionally, wherein: the porous silica material includes a through hole including first pores smaller than a mean free path of an air, and second pores larger than the first pores; the porous silica material has a density of 100 kg/m³ or more and 300 kg/m³ or less; and an isobutyl group is bound to silicon of silica of the silica particles.

According to the above aspect, with an isobutyl group bound to silicon of silica of the silica particles, the flexibility of the silicate network is high and the compactness lowers. Therefore, even with a density similar to those of conventional porous silica materials, it is possible to realize a porous silica material having a low sound speed. Using the porous silica material as a photoacoustic propagation medium portion, it is possible to realize an optical microphone with a higher sensitivity.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 3 is a diagram illustrating a conventional method for synthesizing a porous silica material using TMOS.

FIG. 14 is a diagram showing the measurement results obtained by the configuration shown in FIG. 11, showing an example of a map displaying maximum amplitude values.

DETAILED DESCRIPTION

Figure 1:
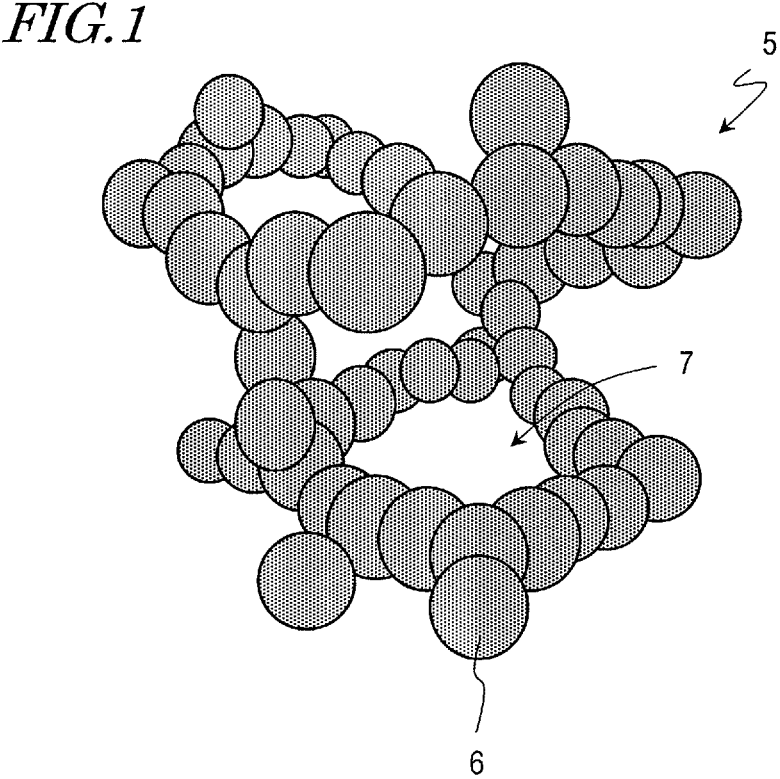
FIG. 1 is a schematic perspective view showing a structure of an embodiment of the porous silica material.

The present inventors conducted an in-depth study on the relationship between the structure and the physical properties of porous silica materials. As a result, it has been found that the characteristic that the sound speed is lower than that of the air is related to the pore structure of the porous silica material. It was also found that it is possible to obtain a novel porous silica material having a density similar to, and a sound speed lower than, those of conventional porous silica materials, by using TMOS and diisobutyldimethoxysilane (hereinafter abbreviated as DIBDMS) as materials. The structure of DIBDMS is shown in (Formula 2) below.

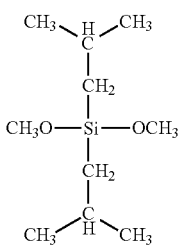

[Formula 2]

According to one general aspect of an exemplary embodiment of the present invention, a porous silica material is a porous silica material in which silica particles are connected to one another three-dimensionally, wherein: the porous silica material includes a through hole including first pores smaller than a mean free path of an air, and second pores larger than the first pores; the porous silica material has a density of 100 kg/m$^3$ or more and 300 kg/m$^3$ or less; and an isobutyl group is bound to silicon of silica of the silica particles.

The porous silica material may not contain a methoxy group.

According to one general aspect of another exemplary embodiment, a porous silica material is a porous silica material in which silica particles are connected to one another three-dimensionally, wherein in a $^{13}$C solid NMR analysis which uses tetramethylsilane as an external reference: there is no signal at 65 ppm or more and 66 ppm or less, and there is a signal at 24 ppm or more and 27 ppm or less; or there is a signal at 65 ppm or more and 66 ppm or less and a signal at 24 ppm or more and 27 ppm or less, wherein an intensity of the signal at 24 ppm or more and 27 ppm or less is greater than twice an intensity of the signal at 65 ppm or more and 66 ppm or less.

According to one general aspect of still another exemplary embodiment, an optical microphone is an optical microphone including: a reception section including a photoacoustic propagation medium portion formed by the porous silica material according to any of the above, wherein a sound wave enters the reception section from a space around the reception section and propagates through the photoacoustic propagation medium portion; a detection section for outputting light of a wavelength that passes through the porous silica material and the light passes through the photoacoustic propagation medium portion through which the sound wave is being propagated so as to detect the light which has been modulated by the sound wave, thereby outputting a detection signal; and a conversion section for converting the detection signal to a sound pressure to output a received signal.

According to one general aspect of still another exemplary embodiment, a method for manufacturing a porous silica material includes the steps of: mixing tetramethoxysilane and diisobutyldimethoxysilane together in a solvent to obtain a sol; adding water to the sol and holding the sol for a predetermined period of time to obtain a gel; and removing the solvent from the gel to dry the gel.

In the step of obtaining the gel, the tetramethoxysilane and the diisobutyldimethoxysilane may be mixed together at a mass ratio of 1:0.4 or more and 1:1 or less.

An embodiment of a porous silica material and an optical microphone will now be described in detail.

First Embodiment

An embodiment of a porous silica material will now be described in detail.

FIG. 1 is a diagram schematically showing the structure of a porous silica material 5 of the present embodiment. As shown in FIG. 1, the porous silica material 5 has a structure in which a plurality of silica particles 6 are connected to one another three-dimensionally. It is believed that the silica particles 6 are bound to one another by a predetermined binding energy. The silica particles 6 each have a spherical shape with a particle diameter of about some nm to some tens of nm. The particle diameter of the silica particles 6 may be 3.5 nm or more in order to realize a sound speed lower than that of the air, and the particle diameter of the silica particles 6 may be 8 nm or more in order to obtain a sound speed of 100 m/s or less. Where the porous silica material 5 is used as the photoacoustic propagation medium portion, the particle diameter of the silica particles 6 may be 20 nm or less in view of the optical transmittance. The "particle diameter" is an average size measured by a transmission method using small angle X-ray scattering (horizontal sample stage type strong X-ray diffractometer, RINT-TTR III from Rigaku Corporation) and obtained by using analysis software, NANO-Solver. The analysis software, NANO-Solver, was used while setting scatterer model to sphere, particle to $SiO_2$ and matrix to the air.

Figure 2:
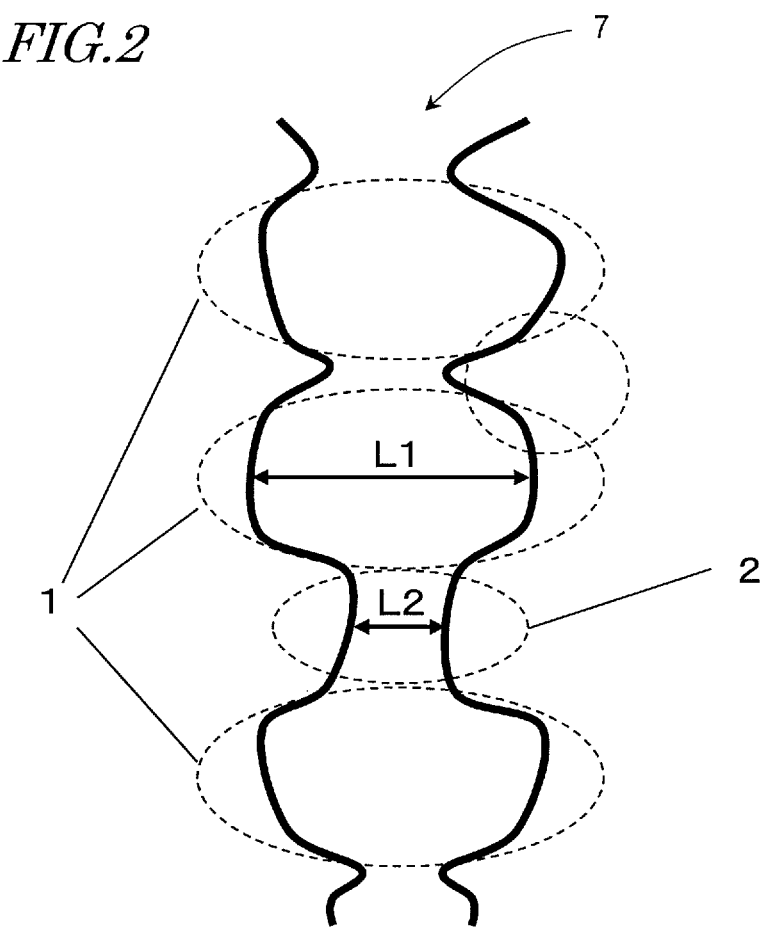
FIG. 2 is a schematic diagram showing a cross section of a through hole of the porous silica material shown in FIG. 1.

In the porous silica material 5, voids are formed between the plurality of silica particles 6 connected to one another three-dimensionally. FIG. 2 is a schematic cross-sectional view showing some of the voids of the porous silica material 5. The voids are continuous with one another in the porous silica material 5, thus forming a through hole 7 as a whole. As shown in FIG. 2, the through hole 7 includes a plurality of cavity portions 1 (second pores), and a plurality of constriction portions (first pores) 2 located between the cavity portions 1. The cavity portions 1 are portions of the through hole 7 with relatively larger inner diameters and the constriction portions 2 are portions thereof with relatively smaller inner diameters, formed as the silica particles 6 connect to one another three-dimensionally and randomly. As shown in FIG. 2, the inner diameter L2 of the constriction portion 2 is smaller than the inner diameter L1 of the cavity portion 1. The inner diameter L2 of the constriction portion 2 may be smaller than the mean free path of the air. Herein, the "inner diameter" means a pore diameter of the highest existence ratio in the sample, obtained as a result of analysis by the BJH method in the pore distribution measurement to be described later.

If the inner diameter L2 of the constriction portion 2 is smaller than the mean free path of the air, the sound wave cannot propagate through the air filling up the through hole 7 of the porous silica material 5. Therefore, it is believed that with the porous silica material 5 of the present embodiment, the sound wave does not propagates through the air filling up the pores but propagates through the skeleton formed by the silica particles 6.

The mean free path of the air depends on the pressure and the temperature. Herein, "the inner diameter L2 of the constriction portion 2 being smaller than the mean free path of the air" means that "the inner diameter L2 of the constriction portion 2 is smaller than the mean free path of the air" at the temperature and the pressure at which the porous silica material 5 is used.

For example, where the porous silica material 5 is used under normal temperature and pressure, the mean free path of the air is about 68 nm. Therefore, the inner diameter L2 of the constriction portion 2 may be smaller than 68 nm.

In practice, where an optical microphone using the porous silica material 5 of the present embodiment is used under a pressure of 50000 Pa or more and 120000 Pa or less and in a temperature range of −20° C. or more and 200° C. or less, the mean free path of the air is greater than about 50 nm and 180 nm or less. Therefore, as long as the inner diameter L2 of the constriction portion 2 is 50 nm or less, it can be used in these temperature and pressure ranges. That is, the inner diameter L2 of the constriction portion 2 of the porous silica material 5 may be 50 nm or less.

The density of the porous silica material 5 may be 100 $kg/cm^3$ or more and 300 $kg/m^3$ or less. If the density is greater than 300 $kg/m^3$, it is difficult to produce the porous silica material 5 with uniform physical properties. If the density is smaller than 100 $kg/cm^3$, the porous silica material 5 becomes more brittle and fragile, and it is difficult to ensure a sufficient strength. Herein, the "density" is the ratio between the mass of the porous silica material 5 and the volume of the porous silica material 5. The volume of the porous silica material 5 includes pores whether they are open pores or closed pores.

Next, the chemical structure of the porous silica material 5 of the present embodiment will be described. The silica particles 6 of the porous silica material 5 are formed by a silica compound in which part of the siloxane bond is replaced with an isobutyl group. More specifically, the silica compound has a silica ($SiO_2$) skeleton in which adjacent silicate tetrahedrons form a mesh structure while sharing an oxygen atom therebetween, and an isobutyl group ($CH_2CH(CH_3)_2$) is bound to silicon (Si) of the silica skeleton. The mesh structure described above is referred to also as the "silicate network". In the silica, as long as silicon to which an isobutyl group is bound is included, there is no particular limitation on the proportion between silicon to which an isobutyl group is bound and silicon to which an isobutyl group is not bound. Note however that in order to realize the porous silica material 5 having a sufficiently lower sound speed as compared with a conventional porous silica material of a similar density, the element ratio between silicon to which an isobutyl group is bound and silicon to which an isobutyl group is not bound may be in the range of 1:2200 to 1:400. One or two isobutyl groups may be bound to silicon, and it is preferred that two are bound to silicon. In order to examine the proportion between silicon to which an isobutyl group is bound and silicon to which an isobutyl group is not bound in the porous silica material 5, the $^{29}$Si-NMR analysis can be used, for example.

Silicon to which an isobutyl group is not bound binds to an adjacent silicon with oxygen therebetween to form an Si—O—Si bond, or binds to a hydroxyl group (OH). It may bind to an ethoxy group ($OCH_2CH_3$) derived from the starting material (solvent). Alternatively, it may bind to an alkylsilyl group, or the like, through a hydrophobization process.

The porous silica material 5 having such a chemical structure can be synthesized for example by using TMOS and DIBDMS as starting materials. A method for synthesizing a conventional porous silica material will be described before describing a method for producing the porous silica material 5.

FIG. 3 shows a method for producing a conventional porous silica material. A conventional porous silica material is produced through the hydrolysis step (S1), the polycondensation step (S2), and the gelation step (S3) using TMOS as a starting material, for example. As shown in FIG. 3, in the hydrolysis step (S1), the methoxy group of TMOS is first hydrolyzed, and the hydroxyl group binds to silicon. Next, in the polycondensation step (S2), water is released through dehydration condensation from two silicons having the hydroxyl group, thereby forming an Si—O—Si bond. That is, the OH group of a silicate tetrahedron undergoes a polycondensation reaction (S2) with the OH group of an adjacent silicate tetrahedron, and binds thereto sharing oxygen, thus forming a silicate network. Then, in the gelation step (S3), as the formation of the silicate network proceeds for the entire sol liquid, the viscosity of the sol liquid increases and the sol liquid gelates, losing its fluidity.

Since TMOS is tetrafunctional, the above reaction occurs with four methoxy groups. Therefore, it is believed that most of the four methoxy groups are converted to Si—O—Si bonds, thereby forming a silicate network in which there are few unreacted groups and the voids are small. It is presumed that as a result, the silica particles are compact and hard, and the modulus of elasticity of the porous silica material is high.

In contrast, the porous silica material 5 of the present embodiment uses TMOS and DIBDMS as starting materials. TMOS and DIBDMS are mixed together in a solvent to produce a sol, and water is added to the sol and the sol is held for a predetermined amount of time, thereby allowing for hydrolysis of alkoxy groups of TMOS and DIBDMS, dehydration polycondensation from hydroxyl groups produced by the hydrolysis, and gelation through polymerization growth. Then, as with the conventional technique, the gel is dried by removing the solvent from the gel through supercritical drying, thereby obtaining the porous silica material 5. Ethanol, or the like, may be used as the solvent, for example. The solation can be done by, for example, leaving for 24 hours at a temperature of 70° C., for example.

Figure 4:
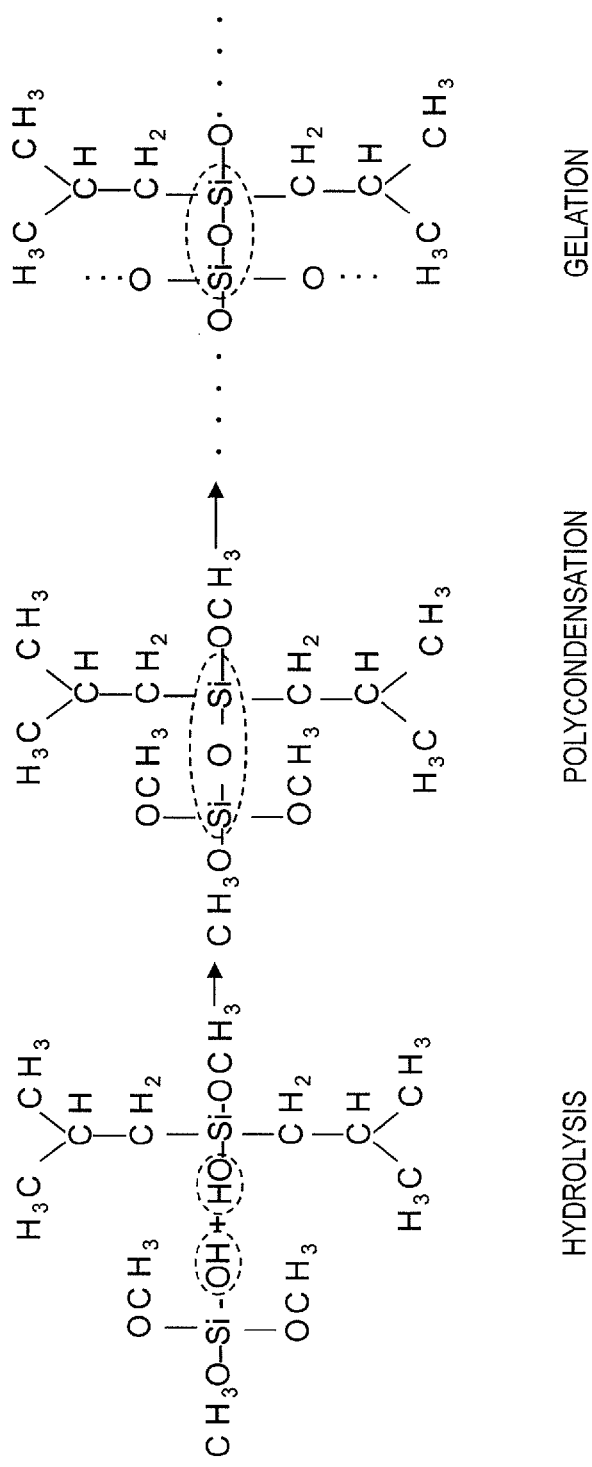
FIG. 4 is a diagram illustrating a method for synthesizing a porous silica material of an embodiment.

During the synthesis through the above-described reaction of the porous silica material 5, since DIBDMS has two methoxy groups and two isobutyl groups as shown in FIG. 4, there are only two methoxy groups in DIBDMS that can contribute to hydrolysis and condensation polymerization. Where these starting materials are hydrolyzed, the isobutyl group of DIBDMS is not hydrolyzed and cannot undergo a polycondensation reaction. Due to steric hindrance by the isobutyl group of DIBDMS, it becomes harder for DIBDMS to undergo a polycondensation reaction, and therefore the gelation proceeds slowly. Thus, the silica particles grow larger. After the gelation, in the obtained silica particles, silicon deriving from DIBDMS is only forming two Si—O—Si bonds at most, with the isobutyl group bound to the other two bonding hands of silicon. That is, the isobutyl group is bound to part of silicon forming the silicate network.

Since the silica particles of the porous silica material of the present embodiment include silicon bound to isobutyl groups, the number of Si—O—Si bonds in the silica network is smaller, and the silicate network has higher flexibility and reduced compactness, as compared with conventional silica particles. Thus, the modulus of elasticity of the porous silica material 5 decreases, and the sound speed decreases.

When the solution of gelated silica is replaced with a gas, the high flexibility of the silicate network prevents the structure of the porous silica material 5 from being destroyed during drying. Thus, clouding of the silica particles due to structural destruction is prevented, and therefore the porous silica material of the present embodiment has a high transmittance. For these characteristics, the porous silica material 5 of the present embodiment has a lower sound speed as compared with a conventional porous silica material of the same density. Thus, it is possible to realize a porous silica material having a density similar to, and a sound speed lower than, those of conventional porous silica materials.

As will be described in detail in Example below, with the porous silica material of the present embodiment, the sound speed is low, and the attenuation factor of the sound wave is also small. Therefore, where the porous silica material of the present embodiment is used as a photoacoustic propagation medium of an optical microphone, it is possible, by lowering the sound speed, to improve the sensitivity of the optical microphone and to increase the efficiency of the optical microphone.

One may possibly consider using, as a starting material, alkoxysilane having a different substituent such as an alkyl group, as a substituent that does not undergo hydrolysis or form Si—O—Si bonds, like an isobutyl group. However, as will be described in Example below, when alkoxysilane having a substituent other than an isobutyl group was used as a starting material, it was not possible to obtain a porous silica material having a sound speed as low as, and a density as small as, those of the porous silica material of the present embodiment.

Whether the silica particles of the porous silica material 5 of the present embodiment contain silicon having an isobutyl group can be suitably determined by the $^{13}C$ solid NMR analysis, for example. As will be described in detail in Example below, where tetramethylsilane is used as the external reference, the signal of the isobutyl group bound to silicon in the porous silica material 5 of the present embodiment appears at 24 ppm or more and 27 ppm or less. Other carbon species having a signal in this region include an isopropoxy group bound to silicon. However, since an isopropoxy group (O-iPr) bound to silicon also has a signal from 65 ppm to 66 ppm, it is possible to suitably distinguish between an isopropoxy group and an isobutyl group in the porous silica material of the present embodiment based on the presence/absence of the signal appearing from 65 ppm to 66 ppm.

Specifically, in a $^{13}C$ solid NMR analysis in which tetramethylsilane is used as the external reference, silica particles include an isobutyl group when there is no signal at 65 ppm or more and 66 ppm or less and there is a signal at 24 ppm or more and 27 ppm or less. Also, when there is a signal at 65 ppm or more and 66 ppm or less and at 24 ppm or more and 27 ppm or less, wherein the intensity of the signal at 24 ppm or more and 27 ppm or less is more than twice the intensity of the signal at 65 ppm or more and 66 ppm or less, it can be identified as being the porous silica material of the present embodiment since more isobutyl groups than isopropoxy groups are included in the silica particles.

With the silica particles of the porous silica material of the present embodiment, a signal deriving from the methoxy group is not seen around 49 ppm to 50 ppm. This will be described in detail below.

The results of producing a porous silica material of the present embodiment and measuring various characteristics thereof will now be described.

Example

1. Production of Porous Silica Material of Example 1

A porous silica material having a size of 10 mm×10 mm×thickness 5 mm was produced through steps of hydrolysis (S1), polycondensation (S2), gelation (S3), and drying (S4).

First, commercially-available TMOS (from Tokyo Chemical Industry) and commercially-available DIBDMS (from Gelest) were mixed together and put into ethanol. Thorough mixing was done, and water was added to the obtained sol liquid for the hydrolysis step (S1) and the polycondensation step (S2). In the present example, 0.01 N ammonia water was used to obtain a catalytic effect. The mixing ratio (mass ratio) thereof is shown in Table 1. After the mixing, it was put into a sealed container, and held for 24 hours in a thermostat oven at 70° C. Thus, hydrolysis and polycondensation of TMOS and DIBDMS progress, and the gelation (S3) of the sol liquid progresses. After 24 hours, a wet gel was produced in which the product of dehydration condensation of TMOS and DIBDMS was dispersed.

An alkoxide of silicon, such as TMOS, is soluble in alcohol but is insoluble in water. Therefore, ethanol serves to uniformly mix TMOS and water together, in addition to adjusting the density. In order to increase the density of the obtained porous material, the mixing proportion of ethanol is decreased. In order to obtain a density higher than 300 kg/m$^3$, the mixing proportion of ethanol needs to be very small, and it will be difficult to produce a uniform wet gel because water is not mixed uniformly. The density may be to be smaller than 300 kg/m$^3$ also for realizing a smaller density and a decreased sound speed.

Then, the wet gel was immersed in ethanol for about hours to clean and remove ammonia water and methanol, which is a reactant. Next, the hydrophobization process was performed. The hydrophobization process liquid was produced by mixing together 38 g of dimethyldimethoxysilane (hereinafter referred to as "DMDMS"), 38 g of ethanol, 2.05 g of water, and 5.55 g of 1 N ammonia water. The wet gel was immersed in the produced hydrophobization process liquid and allowed to react over night at 70° C. After the hydrophobization process, the treatment liquid was discharged, and the product was immersed in fresh ethanol for hours, thereby cleaning the unreacted substance. Then, drying (S4) was performed by supercritical drying using carbon dioxide under a condition of 17 MPa and 80° C., thereby obtaining a porous silica material, which is a dried gel. The sample was obtained as Example 1.

2. Production of Porous Silica Materials of Comparative Examples 1-7

By a method similar to Example 1, Comparative Examples 1 and 3 were produced using only TMOS as a starting material, Comparative Example 2 using TMOS and DIBDMS as starting materials, and Comparative Examples 4-7 using TMOS and dimethyldimethoxysilane (Compound 1, (Formula 3) below), 1,5-diethoxyhexamethylsiloxane (Compound 2, (Formula 4) below), benzoyloxypropyltrimethoxysilane (Compound 3, (Formula 5) below) or hexadecyltrimethoxysilane (Compound 4, (Formula 6) below) as starting materials. The mixing ratios between the starting material(s), ethanol and ammonia water used in Comparative Examples are as shown in Table 1.

TABLE 1

| | Starting material | Mixing ratio | | | |
|---|---|---|---|---|---|
| | | TMOS | DIBDMS/Mixture | Ethanol | Ammonia water |
| Example 1 | TMOS/DIBDMS | 1 | 0.4 | 2.3 | 0.7 |
| Comparative Example 1 | TMOS | 1 | 0 | 3 | 0.5 |
| Comparative Example 2 | TMOS/DIBDMS | 1 | 0.1 | 1.8 | 0.5 |
| Comparative Example 3 | TMOS | 1 | 0 | 1.6 | 0.5 |
| Comparative Example 4 | TMOS/Compound 1 | 1 | 0.4 | 2.3 | 0.7 |
| Comparative Example 5 | TMOS/Compound 2 | 1 | 0.4 | 2.3 | 0.7 |
| Comparative Example 6 | TMOS/Compound 3 | 1 | 0.4 | 2.3 | 0.7 |

TABLE 1-continued

| | Starting material | Mixing ratio | | | |
|---|---|---|---|---|---|
| | | TMOS | DIBDMS/Mixture | Ethanol | Ammonia water |
| Comparative Example 7 | TMOS/Compound 4 | 1 | 0.4 | 2.3 | 0.7 |

[Formula 3]

$$CH_3O-\underset{\underset{CH_3}{|}}{\overset{\overset{CH_3}{|}}{Si}}-OCH_3 \quad \text{(Formula 3)}$$

[Formula 4]

$$CH_3O-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-OCH_3 \quad \text{(Formula 4)}$$

[Formula 5]

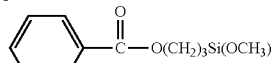

(Formula 5)

[Formula 6]

$$CH_3(CH_2)_{14}CH_2Si(OCH_3)_3 \quad \text{(Formula 6)}$$

3. Pore Measurement of Porous Silica Material of Example 1

Figure 5:
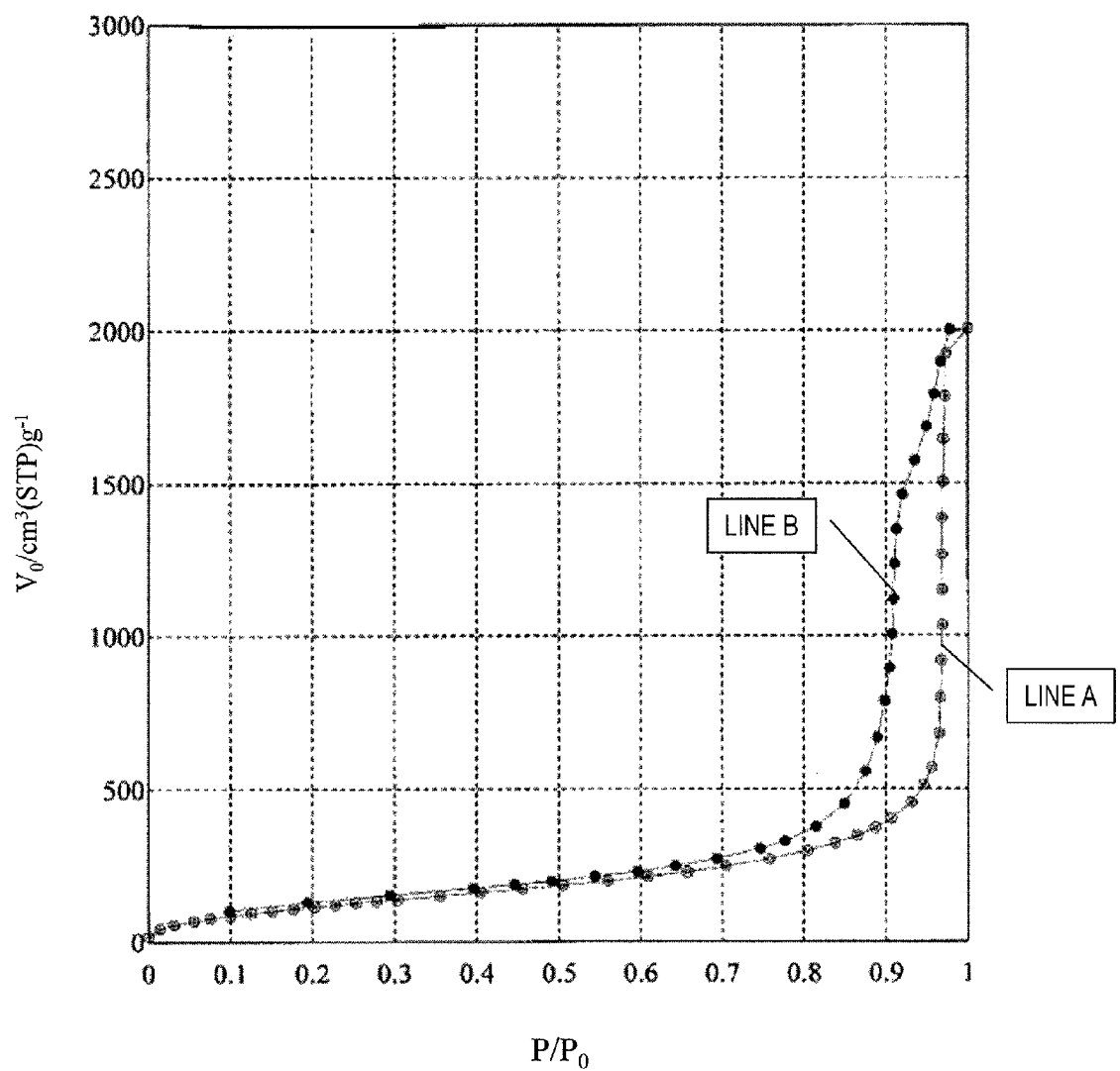
FIG. 5 is a diagram showing nitrogen adsorption isotherms of the porous silica material of the embodiment.

In order to study the structure of the porous silica material of Example 1, we first focused on the pore structure of the porous silica material. FIG. 5 shows nitrogen adsorption isotherms at 77 K of the porous silica material of Example 1 whose density is about 110 kg/m$^3$. A "nitrogen adsorption isotherm" is a graph obtained by measuring changes in the pressure and the amount of adsorption while keeping the material at a constant temperature (at 77K in this experiment).

The horizontal axis of FIG. 5 represents the relative pressure (P/P$_0$) obtained by dividing the equilibrium pressure by the saturated vapor pressure, which is a value of 0 to 1. P/P$_0$≈1 means that the adsorption gas is condensed in the sample tube. That is, in the adsorption isotherm, at a pressure lower than the saturated vapor pressure, an interaction force between the solid and the adsorption molecule starts acting, thus initiating adsorption and condensation, thereby measuring a higher adsorbate density than in the gas phase. The vertical axis of FIG. 5 represents the amount of adsorption in terms of the volume of the gas V$_0$/cm$^3$ (STP) g$^{-1}$ in the standard state (0° C., 1 atm).

After the porous silica material was heated to 110° C. in a vacuum, the nitrogen adsorption isotherm was measured by using BELSORP-miniII from Bel Japan, Inc.

Line A in FIG. 5 represents measurement values evaluated during the capillary condensation process of the nitrogen gas into the pore, and Line B represents measurement values evaluated during the evaporation process of the liquid nitrogen which had been condensed in the pores. The adsorption-desorption hysteresis representing different measurement values between the capillary condensation process and the evaporation process as described above is generally suggesting that pores of different diameters are connected to one another.

From this, it can be inferred that the pores of the porous silica material have a gourd-shaped structure in which the cavity portions 1 and the constriction portions 2 are connected to one another as shown in FIG. 2.

In the adsorption process, since nitrogen adsorption starts from the cavity portions 1, the pore diameter L1 of the cavity portion 1 dominates the adsorption process. It is believed that in the evaporation process, since desorption starts from the constriction portion 2, the pore diameter L2 of the constriction portion 2 dominates the evaporation process.

From the nitrogen adsorption isotherms A and B shown in FIG. 5, the respective pore distributions were calculated by the BJH method. The BJH method is a commonly-used method for analyzing the pore distribution, which was proposed in 1951 by Barrett, Joyner and Halenda.

Figure 6:
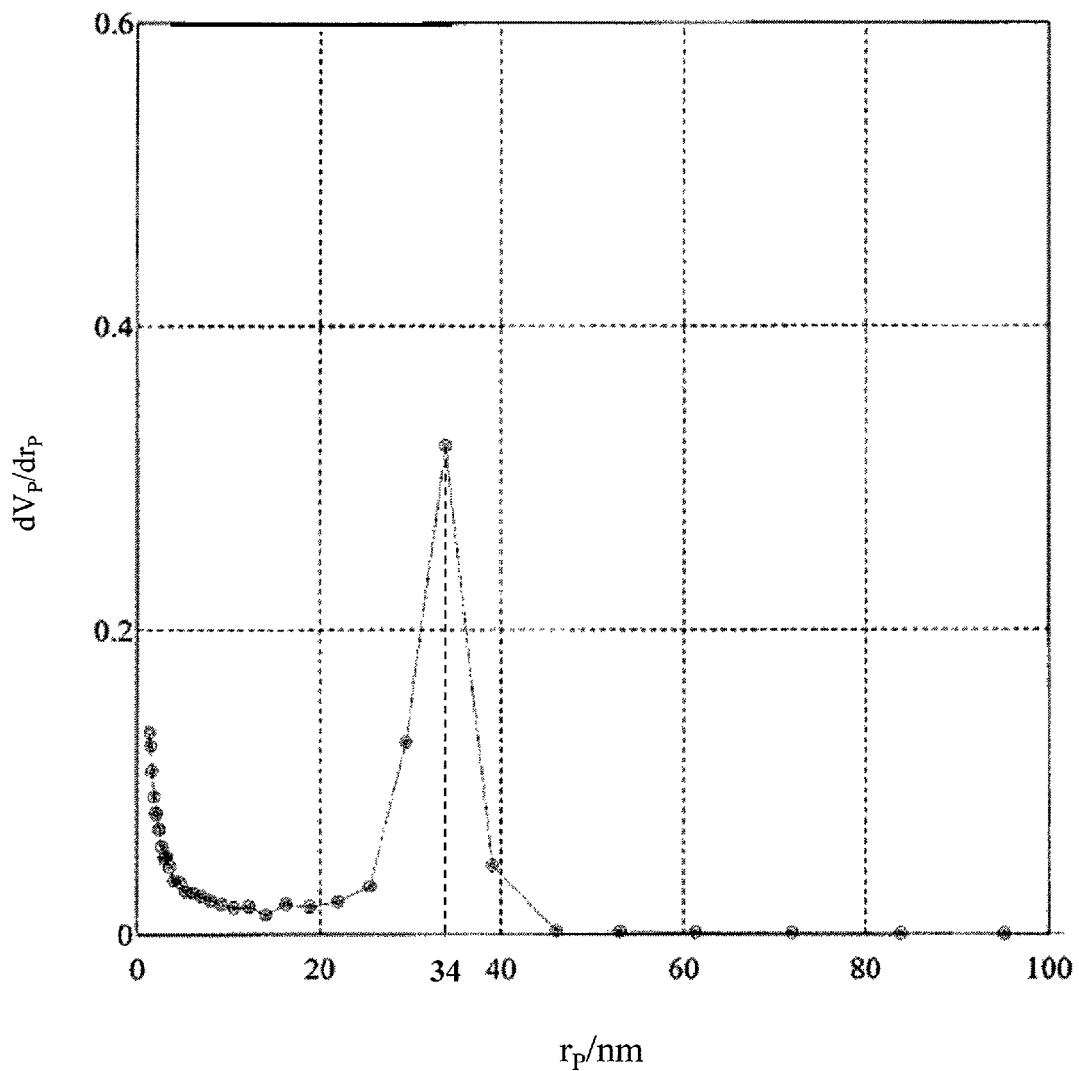
FIG. 6 is a diagram showing the results of calculation by the BJH method from the nitrogen adsorption isotherm A shown in FIG. 5.
Figure 7:
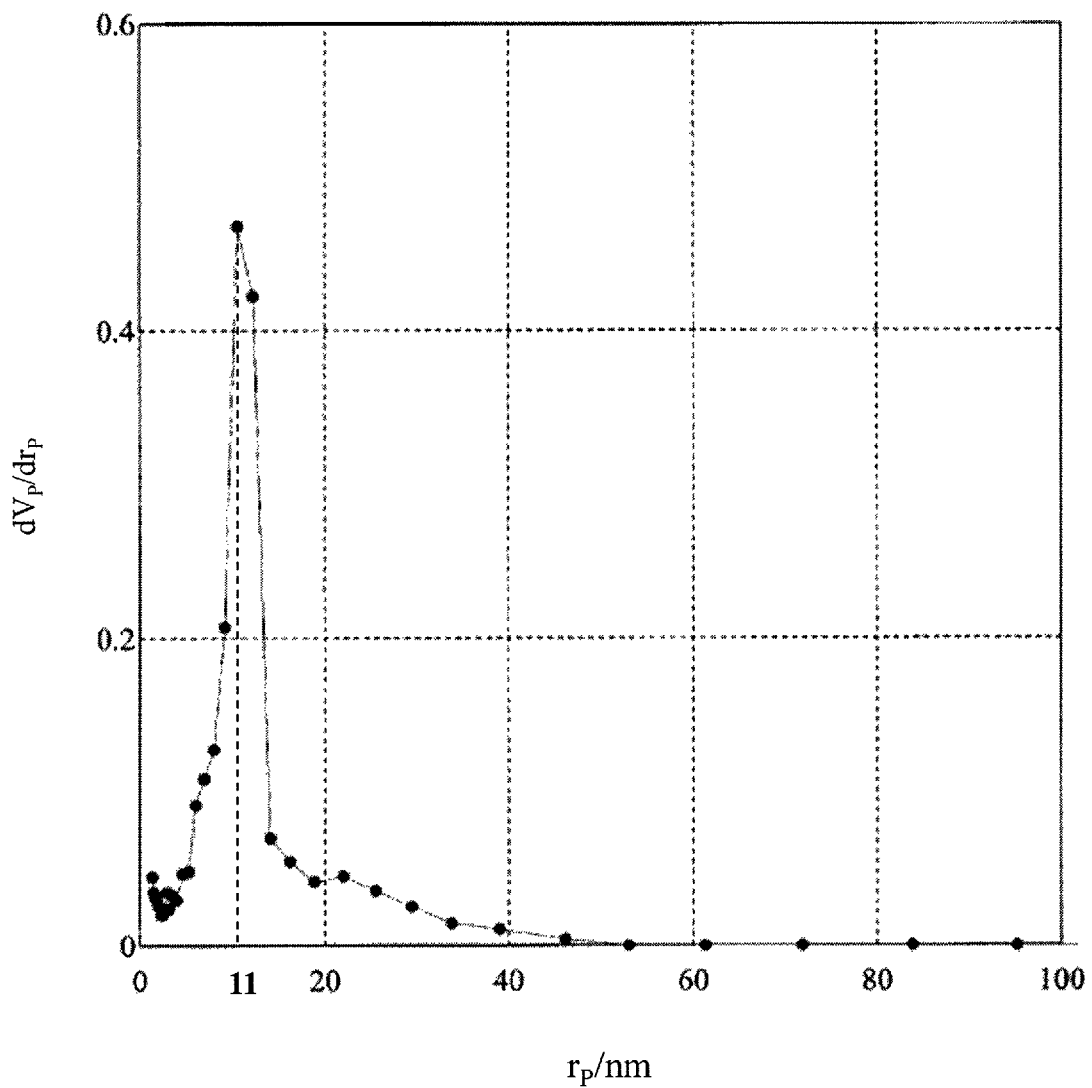
FIG. 7 is a diagram showing the results of calculation by the BJH method from the nitrogen adsorption isotherm B shown in FIG. 5.

FIG. 6 shows the results of calculation by the BJH method obtained from Line A of FIG. 5, and FIG. 7 shows the results of calculation by the BJH method obtained from Line B of FIG. 5. The horizontal axis of FIG. 6 and FIG. 7 represents the pore radius, and the vertical axis represents the pore volume.

As shown in FIG. 6, as a result of calculation by the BJH method, the pore radius obtained from Line A has a distribution centered at about 34 nm. That is, the peak at nm represents the pore radius of the highest existence ratio in the sample. Thus, the pore radius of the highest existence ratio in the sample is defined as being the pore radius of the sample.

As shown in FIG. 7, the pore radius obtained from Line B has a distribution centered at about 11 nm. As with FIG. 6, since 11 nm is the pore radius of the highest existence ratio in the sample, the pore radius obtained from Line B is assumed to be 11 nm.

From these results, it was confirmed that the cavity portion 1 is a pore whose diameter (inner diameter) has a distribution centered at about 68 nm, and the constriction portion 2 connecting to the cavity portion 1 is a pore whose diameter (inner diameter) has a distribution centered at about 22 nm.

That is, it was confirmed that while the pore of the porous silica material of Example 1 is a pore, it is intermittently divided by constrictions whose pore diameter is smaller than the mean free path of the air, and that the sound wave hardly propagates through the air in the pore. This is one of the major reasons why the sound speed of the porous silica material is slower than the air, and is one condition for enabling the structure of a porous silica material having a low sound speed.

4. $^{13}C$ Solid NMR Measurement for Porous Silica Materials of Example 1 and Comparative Example 2

The $^{13}C$ solid NMR analysis was conducted for the porous silica materials of Example 1 and Comparative Example 2. The $^{13}C$ solid NMR measurement is an analysis method for examining molecular structures, etc., by observing the phenomenon in which an atomic nucleus in a substance placed in a magnetic field resonates with an electromagnetic wave of a particular wavelength. The chemical shift of an NMR signal is a parameter that depends on the electron density distribution in the vicinity of the atom, and reflects the local stereostructure of the molecule. By measuring the chemical shift of the constituent atoms of a certain molecular, it is possible to estimate the stereostructure of the molecule.

UNITY INOVA400 from Varian, Inc., having a 7-mm CPMAS probe from Varian, Inc., was used for the measurement. The measurement was conducted at room temperature. By the magic angle spinning method (abbreviated as MAS), the sample was spun at a spinning speed of 4 KHz. With solid NMR, particles placed in the magnetic field are oriented in various directions, thereby leading to an anisotropy of the chemical shift and widening of the line width of the signal. Therefore, the measurement is conducted while spinning the sample at a high speed about an axis that is inclined by 54.7° (the magic angle) with respect to the direction of the magnetic field. Thus, the anisotropy can be erased and the signal becomes sharp.

The observed angle is $^{13}C$. The observation frequency was 100.567 MHz, and tetramethylsilane was used as the shift reference substance by the external reference method and was used as 0 ppm. The signal take-in time was 0.05 sec, the observation width was 40 KHz, and the observation center was around 20 ppm. The pulse sequence was dipole decoupling (DD), and the contact time was 4 msec. The measurement was conducted with 45° pulses for 2.5 µs. The measurement repetition time was 120 sec, and the number of times of integration was 2600.

Figure 8:
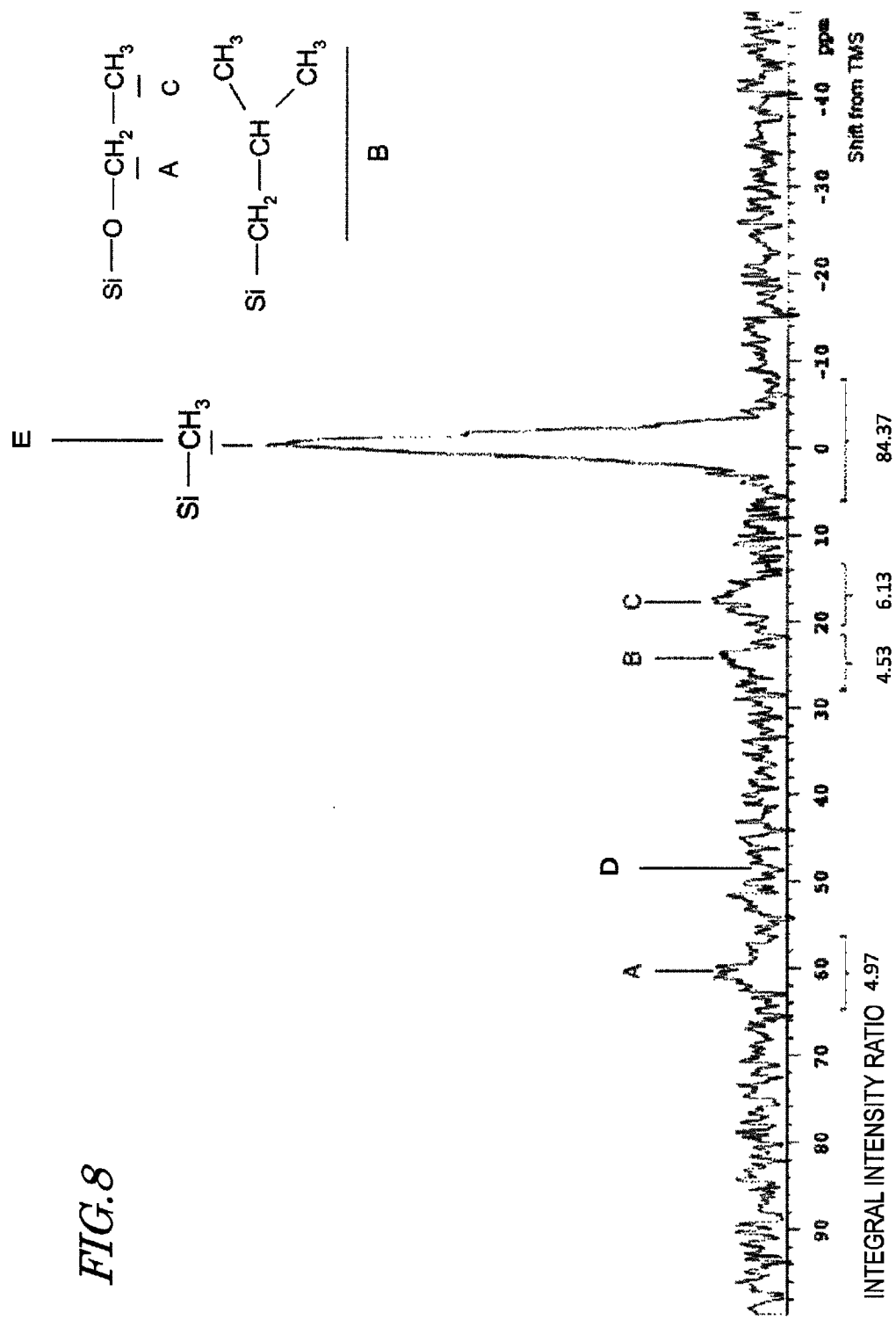
FIG. 8 is a diagram showing a $^{13}$C-DDMAS-NMR spectrum of a porous silica material of Example 1.

FIG. 8 is a $^{13}C$-DDMAS-NMR spectrum of the porous silica material of Example 1. The vertical axis of FIG. 8 represents the signal intensity, and the horizontal axis represents the chemical shift. FIG. 8 also shows molecular structures associated with chemical shift values along the horizontal axis. The molecular structures associated with the chemical shift values will now be described.

Signal C and Signal A appearing at the chemical shift of 17 ppm-18 ppm and the chemical shift of 60 ppm-62 ppm derive from the ethoxy group ($OC_2H_5$ group). Signal B appearing at the chemical shift of 24 ppm-27 ppm derives from the isobutyl group. Signal D appearing around the chemical shift of 49 ppm to 50 ppm derives from the methoxy group ($OCH_3$ group). Signal E appearing around the chemical shift of 0 ppm derives from the methyl group ($CH_3$ group).

Four signals A, B, C and E can be observed in the $^{13}C$-DDMAS-NMR spectrum shown in FIG. 8. Here, it was determined that a signal was observed when a signal intensity greater than or equal to twice the noise intensity (baseline) was confirmed.

The four signals appearing in the $^{13}C$-DDMAS-NMR spectrum shown in FIG. 8 are associated with three different molecular structures. Specifically, they are the following three: the methyl group (Signal E) whose signal is around the chemical shift of 0 ppm, the isobutyl group (Signal B) whose signal is at the chemical shift of 24 ppm-27 ppm, and the ethoxy group (Signals A and C) whose signals are at the chemical shift of 17 ppm-18 ppm and the chemical shift of 60 ppm-62 ppm.

These signals will now be discussed. The sample of Example 1 measured was a porous silica material having undergone the cleaning and drying step. Therefore, it is unlikely that unreacted TMOS and DIBDM which are the starting materials and are volatile liquids, DMDMS contained in the hydrophobization process liquid, or ethanol which is a solvent, are contained in the sample of Example 1 so much that the signal is observed with a higher intensity than the noise intensity in the $^{13}C$-NMR measurement. Therefore, it is possible to eliminate the possibility that these substances are independently contained in the sample of Example 1.

First, from the presence of Signal E of the methyl group, it can be inferred that DMDMS for the hydrophobization process is bound to the terminal group of the silicate network. From the presence of Signals A and C of the ethoxy group, it can be inferred that ethanol which is a solvent has been hydrolyzed and is bound to the silicate network through polycondensation. From the presence of Signal B of the isobutyl group, it can be inferred that DIBDMS is forming the silicate network.

On the other hand, Signal D of the methoxy group appears around the chemical shift of 49 ppm to 50 ppm. However, such a signal is not observed in FIG. 8. Thus, it can be seen that the methoxy group, which existed in TMOS and DIBDMS as the starting materials, was hydrolyzed into the OH group, and further formed an Si—O—Si bond through dehydration condensation so that it did not remain in the porous silica material so much that the signal would be observed. From the above discussion, it can be inferred that in the porous silica material of Example 1, the isobutyl group is bound to silicon of the silica of the silica particles.

Figure 9:
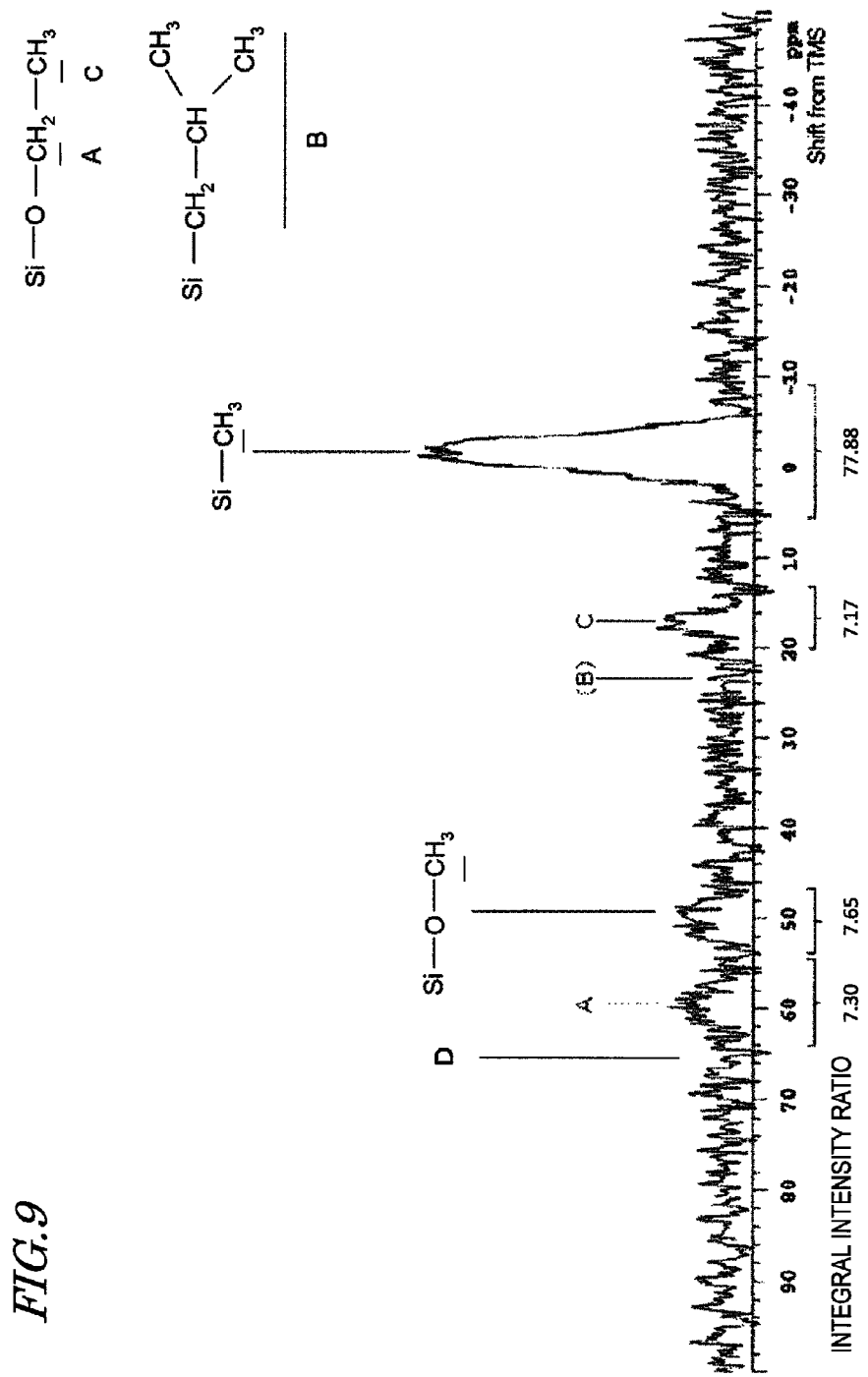
FIG. 9 is a diagram showing $^{13}$C-DDMAS-NMR spectrum of a porous silica material of Comparative Example 2.

FIG. 9 is a $^{13}$C-DDMAS-NMR spectrum for the porous silica material of Comparative Example 2.

In FIG. 9, Signal B is not seen at the position of the chemical shift of 24 ppm-27 ppm. Thus, it can be inferred that in the porous silica material of Comparative Example 2, the isobutyl group is not bound to silicon of the silica of the silica particles.

Table 2 shows the percentages of the functional groups obtained from the signal intensities of the $^{13}$C-DDMAS-NMR spectrum for Example 1 and Comparative Example 2. Since the carbon number differs from one functional group to another, the intensity normalized with the carbon number of the functional group is shown in percentage. For the ethoxy group, since two signals (A and C) are observed, the average of the integrated intensities of the two signals was used.

TABLE 2

| Functional group detected | Percentage (%) | |
| --- | --- | --- |
| | Example 1 | Comparative Example 2 |
| Methyl group | 92.6 | 83.9 |
| Methoxy group | 0 | 8.6 |
| Ethoxy group | 6.0 | 7.5 |
| Isobutyl group | 1.4 | 0 |

From Table 2, it is believed that the amount of the isobutyl group is smaller than the ethoxy group which derives from the solvent in the silica of the porous silica material of Example 1, and that DMDMS from the hydrophobization process is bound to many of the bonding hands of the silica. It is believed that in the silica of the porous silica material of Comparative Example 1, the methoxy group, which is considered deriving from TMOS and DIBDMS as the starting materials, is present in an amount similar to the amount of the ethoxy group deriving from the solvent.

Figure 10:
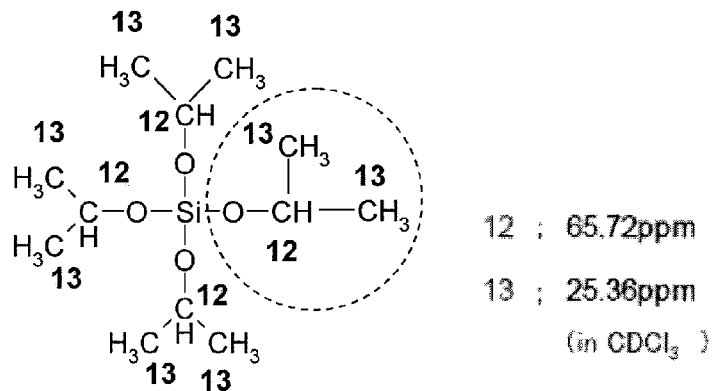
FIG. 10 is a diagram showing the $^{13}$C-NMR signal position of the isopropoxy group.

Note that chemical species for which the signal is seen at 24 ppm-27 ppm include the isopropoxy group in addition to the isobutyl group, as described above. FIG. 10 shows the chemical shifts of the signals of the isopropoxy group disclosed in Website "Spectral Database for Organic Compounds, SDBS (National Institute of Advanced Industrial Science and Technology, an independent administrative agency)" http://riodb01.ibase.aist.go.jp/sdbs/cgi-bin/direct_frame_top.cgi. As shown in FIG. 9, the isopropoxy group has a signal appearing at 24 ppm-27 ppm (25.36 ppm, numbered as 13, in FIG. 10) and a signal appearing at 65 ppm-66 ppm (65.72 ppm, numbered as 12, FIG. 10). The ratio between the signal at 24 ppm-27 ppm and the signal at 65 ppm-66 ppm is 2:1. This is because the signal at 24 ppm-27 ppm is the result of integrating signals from two C's, whereas the peak at 65 ppm-66 ppm is the result of integrating signals from a single C. This suggests that the isopropoxy group is present in the sample when signals appear both at 65 ppm-66 ppm and at 24 ppm-27 ppm. If the intensity of the signal at 24 ppm-27 ppm is greater than twice the intensity of the signal at 65 ppm-66 ppm, the intensity in excess of twice the intensity of the signal at 65 ppm-66 ppm derives from the isobutyl group. Therefore, in such a case, it is indicated that the isobutyl group is present in addition to the isopropoxy group.

In the case of Example 1, since no signal is observed in the vicinity of 65 ppm-66 ppm, as shown in FIG. 8, it can be seen that the isopropoxy group is not present in the porous silica material. Note however that where isopropyl alcohol is used as a solvent when producing the porous silica material of the present embodiment, it is possible that the silica formed by the silicate network and isopropyl alcohol react with each other, and the isopropoxy group is present in the porous silica material. In such a case, it is possible to determine whether the isopropoxy group is contained in the porous silica material and whether the isobutyl group is contained therein by measuring the presence/absence of the signals at 65 ppm-66 ppm and 24 ppm-27 ppm described above and the intensity ratio therebetween.

5. Measurement of Sound Speed of Sound Wave Propagating Through Porous Silica Materials of Example 1 and Comparative Examples 1 to 7

Figure 11:
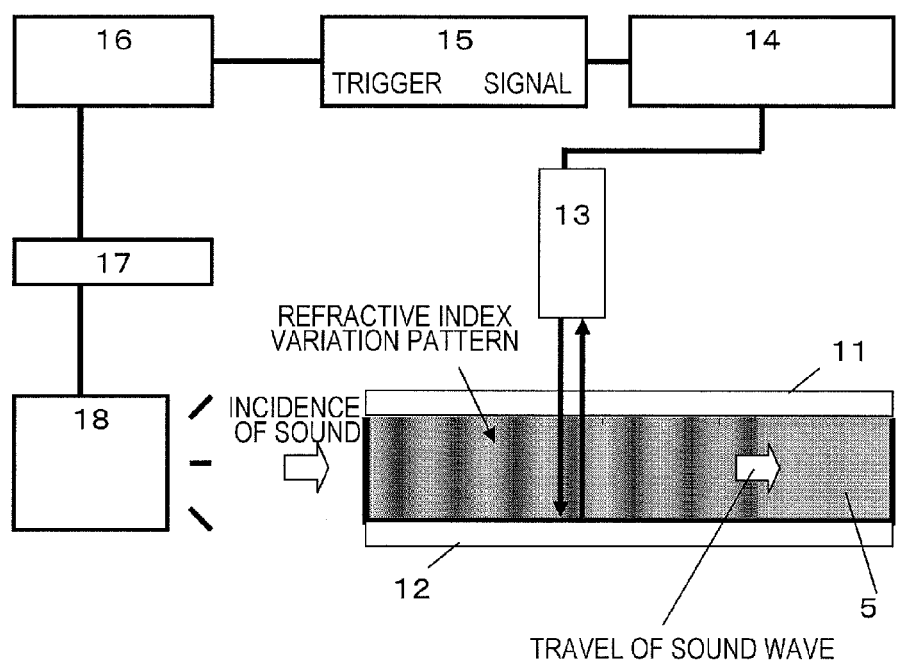
FIG. 11 is a diagram showing a configuration of a non-contact sound speed measurement system for examining the sound speeds of the porous silica materials of Example and Comparative Examples.

The sound speed was measured for the produced porous silica materials. First, the method of sound speed measurement will be described. FIG. 11 is a diagram showing the configuration of a non-contact sound speed measurement system using a laser Doppler vibrometer (Laser Doppler Vibrometer, hereinafter referred to as "LDV"). As shown in FIG. 11, the produced porous silica material 5 was placed on two opposing surfaces, other than the surface through which the sound wave enters, and sandwiched and held between a light-transmissive transparent acrylic plate 11 and a support 12 having a mirror surface. The laser beam output from a head 13 (OFV353 from Polytec, Inc.) of an LDV 14 (OFV3001 from Polytec, Inc.) arranged on the side of the transparent acrylic plate 11 passes through the porous silica material 5, is reflected by the mirror surface of the support 12, and passes again through the porous silica material 5 to return to the LDV head 13. The LDV head 13 can be moved freely in accordance with the point at which the porous silica material is measured. The signal obtained from the LDV 14 was observed by an oscilloscope 15 (TDS744A from Tektronix, Inc.).

A burst signal made of a single sinusoidal wave having a frequency of 40 KHz was generated by a function generator 16 (1930 from NF Corporation), and the produced signal was amplified through a transmission amplifier 17 (M-10X from Pioneer Corporation), oscillating the sound wave of the burst signal from a tweeter 18 (PT-R4 from Pioneer Corporation). The tweeter 18 was placed at a distance of about 210 mm from the surface of the porous silica material 5 through which the sound wave enters.

The burst signal produced from the function generator 16 was also input to the oscilloscope 15 as a trigger.

Figure 12:
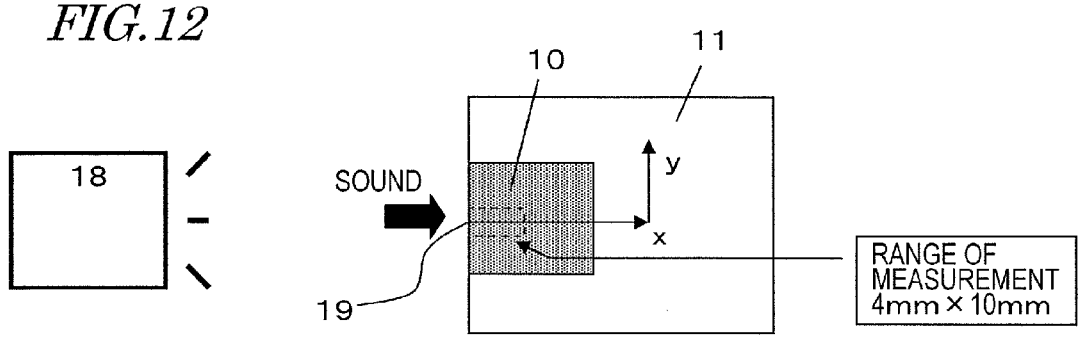
FIG. 12 is a diagram showing an area of the porous silica material across which the sound speed was measured in the configuration shown in FIG. 11.

FIG. 12 shows the range of measurement of the non-contact sound speed measurement system shown in FIG. 11. FIG. 12 is a diagram showing the porous silica material 5 as viewed from the side of the head 13 in FIG. 11. A sound wave incidence center point 19 of the porous silica material 5 is the center point of the sound wave incidence surface of the porous silica material 5. With the sound wave incidence center point 19 as the origin, the direction parallel to the sound wave propagation direction is defined as the x direction. The direction perpendicular to the sound wave propagation direction is defined as the y direction. Across a range extending from the sound wave incidence center point 19 over 10 mm in the x direction and over ±2 mm in the y direction, the laser beams were made to pass therethrough at a pitch of 0.2 mm and measured.

The central portion of the sound wave incidence surface is measured because it is farther away from the boundary between the porous silica material 5 and the transparent acrylic 11 than other portions. A wave propagating through the porous silica material 5 is reflected by the transparent acrylic 11. Therefore, in the vicinity of the boundary between the porous silica material 5 and the transparent acrylic 11, the propagating wave and the reflected wave coexist with each other, and it is difficult to measure the sound speed accurately.

Figure 13:
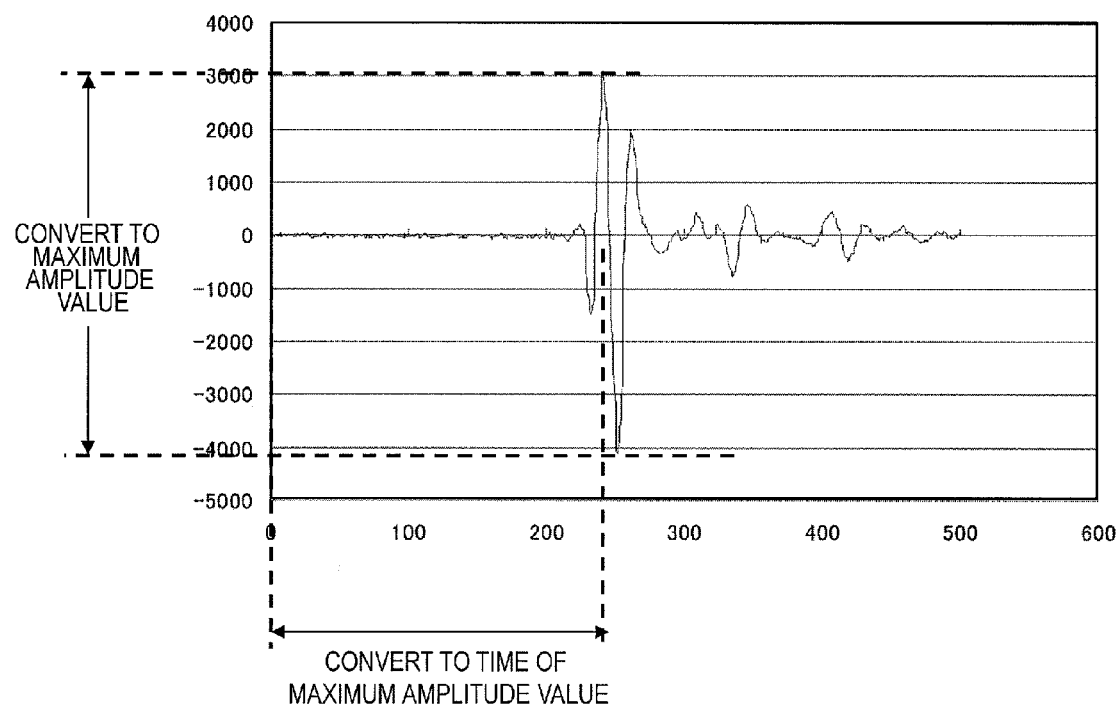
FIG. 13 is a diagram showing an example of a waveform observed on an oscilloscope in the configuration shown in FIG. 11.

FIG. 13 shows the result of observing, with the oscilloscope 15, the output time waveform measured by the LDV at an arbitrary point on the porous silica material 5 when a pulsed sound wave signal is input. In FIG. 13, the horizontal axis represents the measurement time of the oscilloscope 15, and the vertical axis represents the detected signal amplitude (average value over 50 iterations). From the time of arrival of the maximum amplitude of the observed signal, it is possible to calculate the amount of time since the burst wave is oscillated from the tweeter 18, and to convert it to the velocity v of the sound wave measured by the head 13. The vertical axis can be converted to the amplitude of the sound wave.

FIG. 14 is a diagram obtained by mapping the maximum amplitude values at measurement points measured at a pitch of 0.2 mm across the range of measurement. In FIG. 14, the sound wave enters from the left side. The magnitude of the maximum amplitude value is represented by shading. A dark-colored portion represents a large amplitude value, and a light-colored portion represents a small amplitude value. From FIG. 14, it can be seen that the shading is not dependent on the measurement points (positions) but is distributed.

Figure 15:
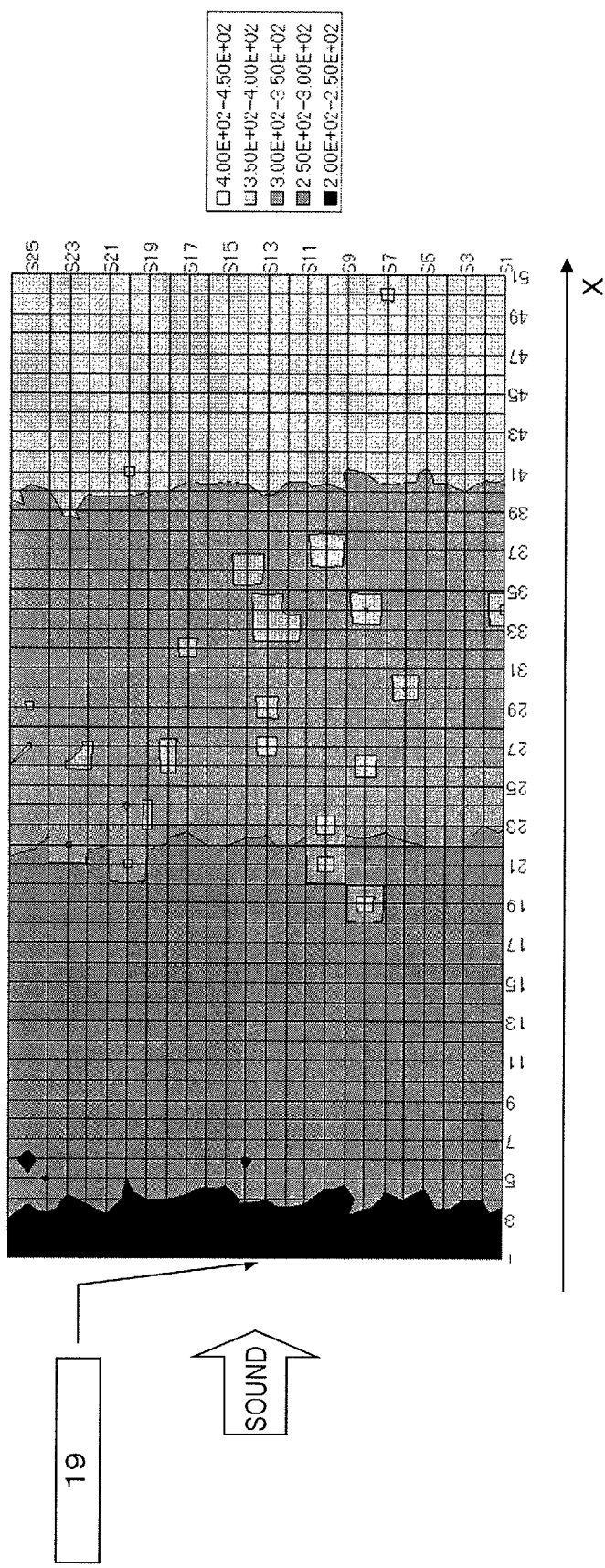
FIG. 15 is a diagram showing the measurement results obtained by the configuration shown in FIG. 11, showing an example of a map displaying points in time of maximum amplitude values.

FIG. 15 is a diagram obtained by mapping the points in time when the maximum amplitude values were obtained at different measurement points. From FIG. 15, it can be seen that the points in time at which the maximum amplitude values were measured are substantially constant in the y-axis direction, and there are more changes farther away from the tweeter 18 in the x-axis direction. Thus, it can be seen that the sound wave is propagating parallel to the y-axis direction.

From FIG. 14 and FIG. 15, it can be seen that the sound wave having entered the porous silica material 5 is propagating through the porous silica material mostly as a plane wave across the measurement range.

Figure 16:
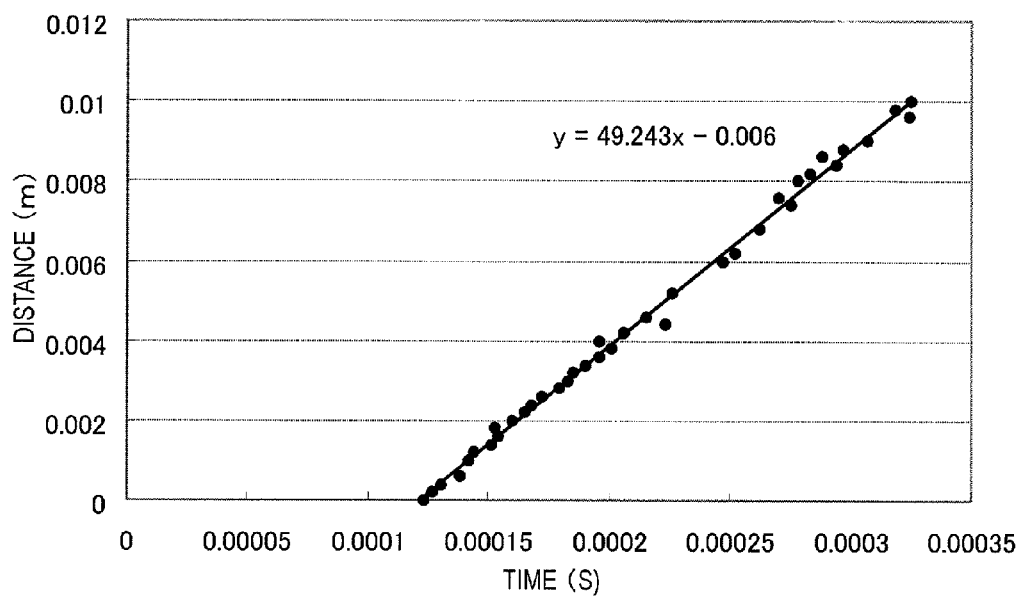
FIG. 16 is a diagram showing the measurement results obtained by the configuration shown in FIG. 11, showing an example of a graph for obtaining the sound speed.

FIG. 16 shows the results of measurement at a pitch of 0.2 mm along a straight line parallel to the y axis that is at a distance of 10 mm in the x direction from the sound wave incidence center point 19, wherein the vertical axis represents the distance from the sound wave incidence center point 19 to the measurement point, and the horizontal axis represents the point in time at which the maximum amplitude value was obtained. The slope of this graph is the sound speed. As shown in FIG. 16, the measurement results were approximated by a straight line, and the slope thereof was obtained. From the slope, it was found that the sound speed of the porous silica material of Example 1 was about 49 m/s.

The sound speeds of the porous silica materials of Comparative Examples 1-7 were obtained similarly. The results are shown in Table 3.

TABLE 3

| | Density (kg/cm$^3$) | Sound speed (m/s) | Transmittance (%) |
|---|---|---|---|
| Example 1 | 110 | 49 | 88 |
| Comparative Example 1 | 110 | 55 | 68 |
| Comparative Example 2 | 150 | 66 | 86 |
| Comparative Example 3 | 150 | 66 | 83 |
| Comparative Example 4 | 130 | 62 | 80 |
| Comparative Example 5 | 120 | 52 | 74 |
| Comparative Example 6 | 110 | 52 | 80.4 |
| Comparative Example 7 | 140 | 68 | 73.6 |

6. Measurement of Optical Transmittance for Porous Silica Materials of Example 1 and Comparative Examples 1 to 7

Figure 17:
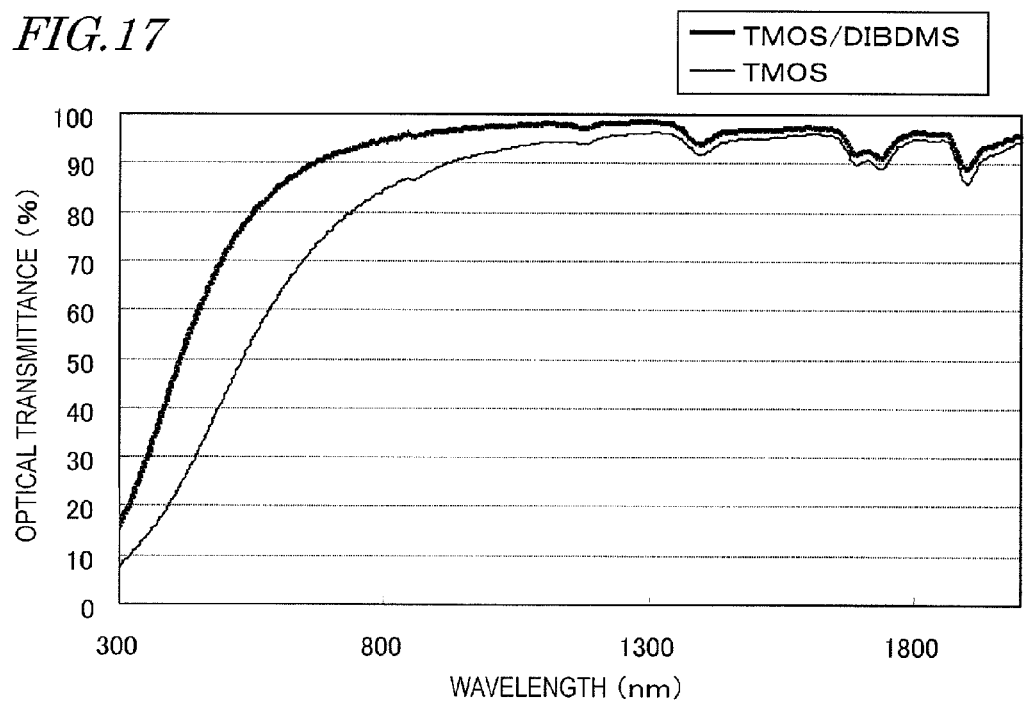
FIG. 17 is a diagram showing an optical transmittance for the porous silica material of Example 1 and the porous silica material of Comparative Example 1.

The optical transmittance was measured for the produced porous silica materials of Example 1 and Comparative Examples 1 to 7. The optical transmittance was derived not by way of linear transmittance but by integrating the transmitted light. The measurement was conducted using a 4000 spectrophotometer from Hitachi, Ltd. This spectrophotometer receives transmitted light on an integrating sphere. Table 3 shows the transmittance at 632 nm. FIG. 17 shows the optical transmittance over the wavelength range of 300 nm to 2000 nm for Example 1 and Comparative Example 3. As can be seen from FIG. 17, it was found that the porous silica material of Example 1 had an increase in the optical transmittance particularly over the wavelength range of 1300 nm or less, as compared with the porous silica material of Comparative Example 3.

7. Measurement of Density for Porous Silica Materials of Example 1 and Comparative Examples 1 to 7

The density was measured for the produced porous silica materials of Example 1 and Comparative Examples 1 to 7. The density was obtained by dividing the weight by the volume. The weight was measured by using an electronic balance (AB204-S from Mettler Toledo International Inc.). The porous silica materials were produced using a mold so that they would have a size of 10 mm×10 mm×thickness 5 mm, but since some samples have slight shrinkage during the drying step, the lengths of the four sides and the thickness of the samples were measured using a measuring microscope so as to obtain the volume using the average value thereof. The measurement results are shown in Table 3.

8. Discussion of Measurement Results

As can be seen from Table 3, the porous silica material of Example 1 has a lower sound speed, as compared with the porous silica materials of Comparative Example 1 and Comparative Example 6 having the same density. It is believed that as the density decreases, the porous silica material will have a higher proportion of through holes and will be more brittle; therefore, it can be seen that the porous silica material of Example 1 can realize a lower sound speed than conventional porous silica materials such as Comparative Example 1, while having a similar density. It is believed that this is because since the isobutyl group, which does not form an Si—O—Si bond, is bound to silicon of the silica forming the silica particles of the porous silica material, the compactness of the silica particles decreases, whereby the density and the modulus of elasticity of the porous silica material decrease and the sound speed decreases as compared with conventional materials.

The transmittance of Example 1 is higher than the transmittance of the porous silica material of Comparative Example 1. It is believed that this is because when the solution of the gelated silica is replaced with a gas, the high flexibility of the silicate network prevents the structure of the porous silica material from being destroyed during drying, thus preventing the clouding of the silica particles due to structural destruction. The characteristic that the transmittance is high is particularly advantageous when the porous silica material is used as a photoacoustic propagation medium. For example, the porous silica material of Example 1 can be suitably used in an optical microphone for taking in a sound wave, and detecting, using light, distortion of the porous silica material caused by the sound wave. For example, where the porous silica material of Example 1 and the porous silica material of Comparative Example 1 are used as a photoacoustic propagation medium of an optical microphone, the optical microphone using Example 1 has an output of 1.26, relative to that where Comparative Example 1 is used, thus improving the sensitivity of the optical microphone by about 30%.

Comparative Examples 4 to 7 are produced by using silane or siloxane having a substituent for which hydrolysis does not occur as the starting material. It can be said that these compounds (Formula 3) to (Formula 6) have a similar nature to DIBDMS of Example 1 in that they have a substituent that does not entail hydrolysis and the subsequent formation of the Si—O—Si bond during the production of the porous silica material. However, the porous silica materials of Comparative Examples 4 to 7 did not realize a density and a sound speed as low as those of the porous silica material of Example 1. Although specific reasons are unknown, it is believed that the size (bulkiness) or the stereostructure of a substituent does not entail hydrolysis are related to the formation of a porous silica material having a low density and a low sound speed.

Although the porous silica material of Comparative Example 2 uses TMOS and DIBDMS as starting materials, it did not realize a density and a sound speed as low as those of the porous silica material of Example 1. Since the $^{13}$C-DDMAS-NMR spectrum shown in FIG. 9 indicates that no signal associated with the isobutyl group is observed, it is believed that the reason why the density and the sound speed are not so low is that the isobutyl group is not bound to silicon of the silica particles of the porous silica material of Comparative Example 2.

Although specific reasons are unknown, it is believed that this is because DIBDMS added as the starting material in Comparative Example 2 is as little as 10% of TMOS. It is presumed that this is because where the proportion of DIBDMS in the starting material is small, polycondensation with TMOS by itself occurs more preferentially than polycondensation between DIBDMS and TMOS due to the steric hindrance by the isobutyl group.

Figure 18:
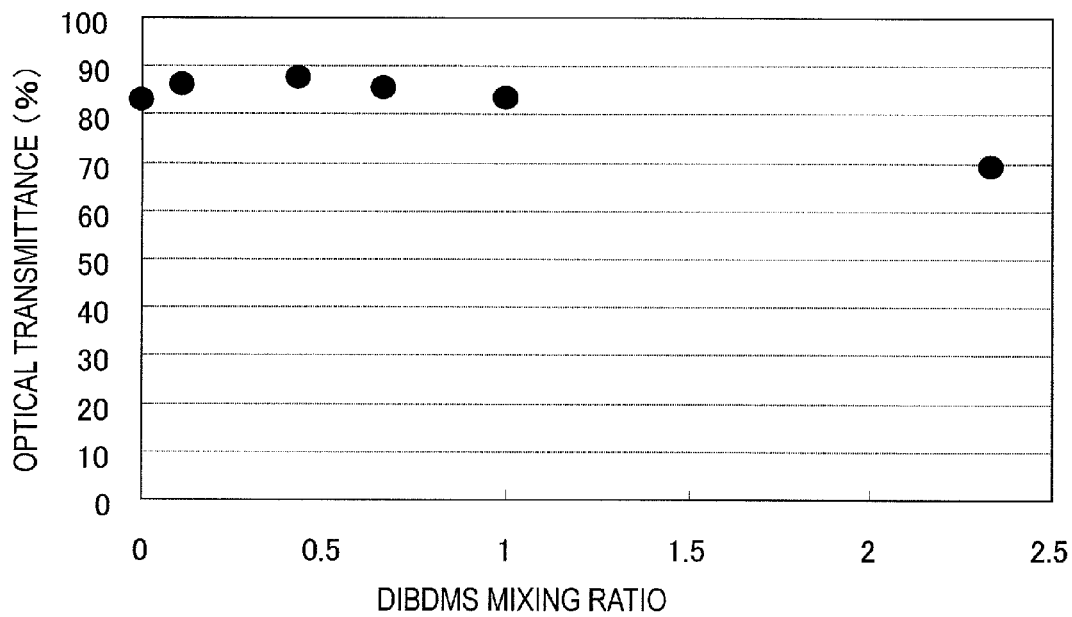
FIG. 18 is a diagram showing the relationship between the mixing ratio of DIBDMS and the optical transmittance of the obtained porous silica material in Example.

9. Mixing Ratio Between TMOS and DIBDMS, and Characteristics of Produced Porous Silica Material In order to determine the preferred mixing ratio between DIBDMS and TMOS, TMOS and DIBDMS were mixed together at ratios of 1:0, 1:0.1, 1:0.4, 1:1 and 1:2.3 to produce porous silica materials by a method similar to Example 1, and the sound speed and the optical transmittance of the porous silica materials were measured by the method described above. The relationship between the mixing ratio and the optical transmittance is shown in FIG. 18. The relationship between the mixing ratio and the sound speed is shown in FIG. 19.

As shown in FIG. 18, an optical transmittance of 80% or more is obtained if the mixing ratio is 1 or less, but the optical transmittance decreases to 70% if the mixing ratio is 2.3. Therefore, it can be seen that in view of the optical transmittance, the mixing ratio between TMOS and DIBDMS may be 1:1 or less, i.e., DIBDMS may be used at a proportion of 1 or less with TMOS being 1.

Figure 19:
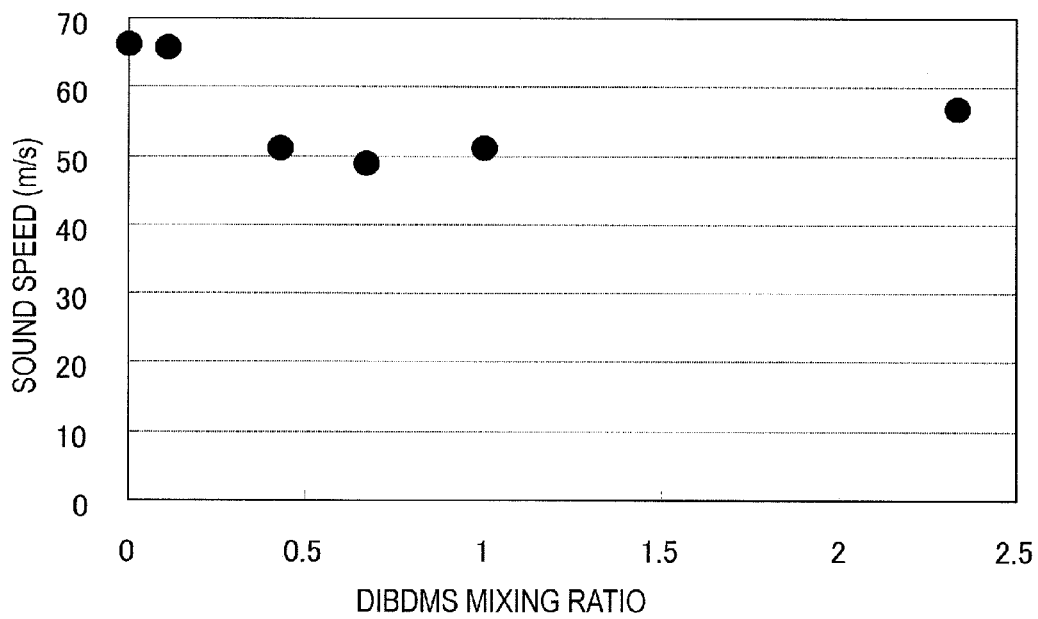
FIG. 19 is a diagram showing the relationship between the mixing ratio of DIBDMS and the sound speed of the obtained porous silica material in Example.

As shown in FIG. 19, when the mixing ratio is 0.4 or more, the sound speed is lower than 60 m/s. As described above, since the isobutyl group is not bound to the silica of the porous silica material if the amount of DIBDMS added is 10% of that of TMOS, it can be seen that the mixing ratio may be 0.4 or more and 2.3 or less in view of the sound speed.

Considering these results, it can be seen that the mixing ratio between TMOS and DIBDMS may be 1:0.4 or more and 1:1 or less.

10. Measurement of Attenuation Factor of Porous Silica Material

Porous silica materials for attenuation factor measurement were produced by methods similar to those of Example 1, Comparative Example 1 and Comparative Example 5. The mixing proportion between alkoxysilane (TMOS, DIBDMS, or the like) and ethanol which is a solvent was varied between these manufacturing methods, thereby varying the density and producing samples having various sound speeds.

The attenuation factor was measured for the produced samples. The attenuation factor measurement was conducted with the measurement system used for obtaining the sound speed using the laser Doppler vibrometer shown in FIG. 11. Where the distance from the sound wave incidence center point 19 in the x direction is denoted as x, and the maximum amplitude value P obtained by FIG. 13 is used, the attenuation factor α can be represented by expression (6) below.

[Expression 6]

$$P = P_0 e^{-\alpha x} \quad (6)$$

Figure 20:
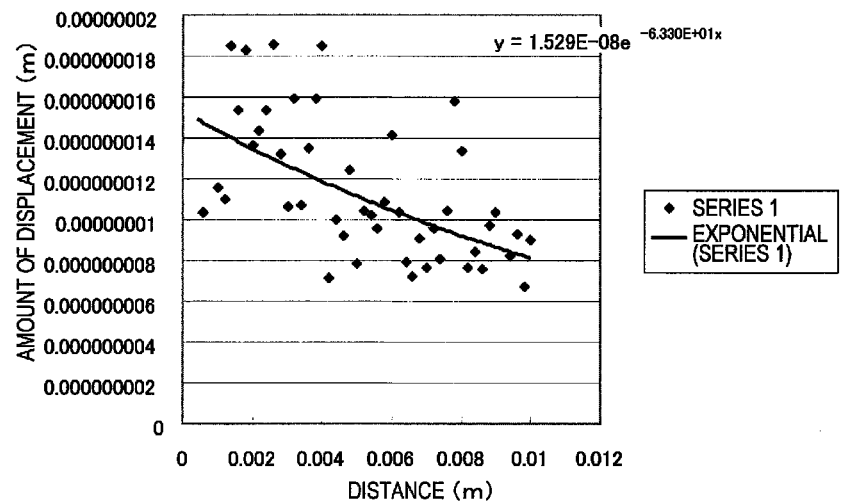
FIG. 20 is a diagram showing the experiment results for obtaining attenuation factors of porous silica materials having various densities in Example, showing the relationship between the propagation distance and the maximum amplitude value for the porous silica materials.
Figure 21:
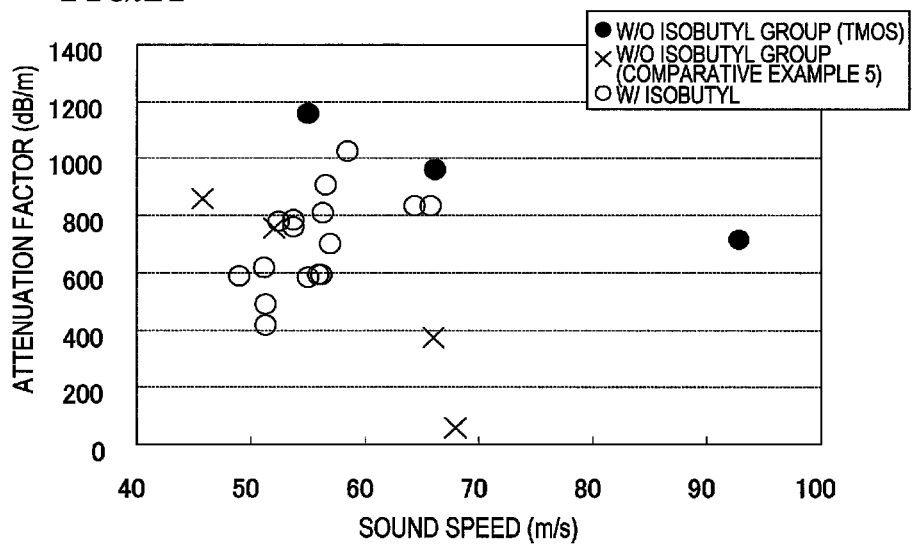
FIG. 21 is a diagram showing the relationship between the sound speed and the attenuation factor for Example and Comparative Examples.

FIG. 20 shows the results of measurement at a pitch of 0.2 mm along a straight line parallel to the y axis that is at a distance of 10 mm in the x direction from the sound wave incidence center point 19, wherein the horizontal axis represents the distance from the sound wave incidence center point 19 to the measurement point, and the vertical axis represents the maximum amplitude value. The measurement results were approximated by the exponential to obtain the attenuation factor α (Np/m). The obtained attenuation factor was converted according to α [dB/m]=8.686×α [Np/m]. The relationship between the obtained sound speed and the obtained attenuation factor is shown in FIG. 21. As can be seen from FIG. 21, the porous silica material having the isobutyl group produced according to the method of Example 1 (represented by o) exhibits a tendency in which the attenuation factor decreases as the sound speed decreases. In contrast, the porous silica materials having the isobutyl group produced in Comparative Example 1 and Comparative Example 5 (represented by ● and x) exhibit a tendency in which the attenuation factor increases as the sound speed decreases.

Typically, attenuation of a sound wave through silica includes attenuation by scattering and attenuation by absorption. The attenuation by absorption is due primarily to viscosity of silica. It is said that the attenuation due to viscosity is in proportion to the square of the frequency, and is in inverse proportion to the cube of the sound speed ("Course On Sonics 8: Ultrasonic Wave" edited by Acoustical Society Of Japan (edited by Nakamura, a professor of Tohoku University; P 28-29)).

As described above, the particle diameter of the porous silica material of the present example may be 20 nm or less. Since the frequency of the sound wave used in the measurement of the attenuation factor is 40 KHz and the sound speed is 50 m/s to 100 m/s, the wavelength of the sound wave is about 1.25 nm to 2.5 nm. Therefore, it is believed that under the conditions under which the attenuation factor was measured, the particle diameter of the porous silica material is sufficiently small as compared with the wavelength of the sound wave, and the attenuation by scattering is very small. That is, it is believed that with the porous silica material having the isobutyl group produced according to the method of Example 1, the attenuation by absorption, rather than the attenuation by scattering, is the dominant factor.

Figure 22:
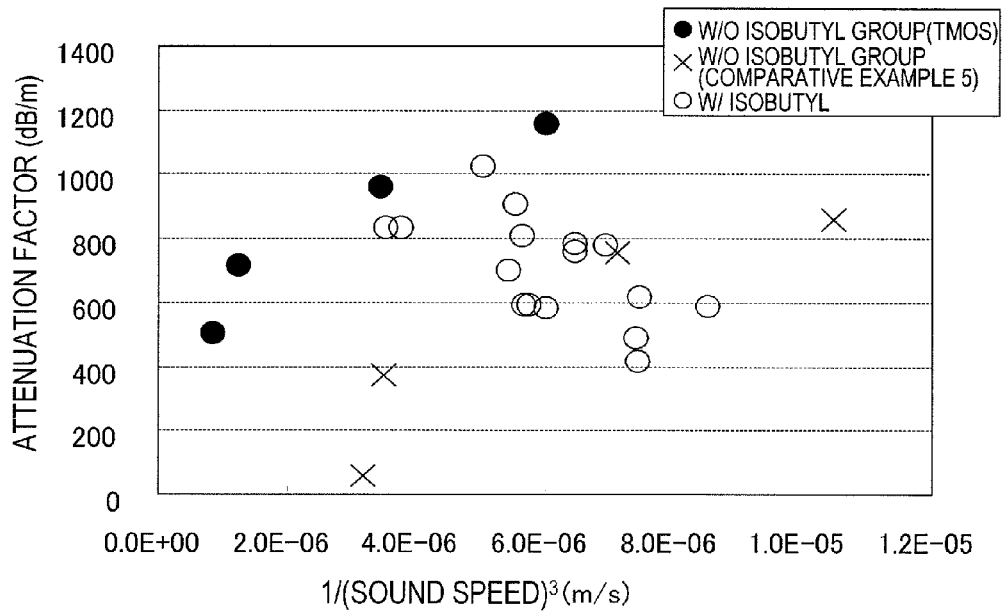
FIG. 22 is a diagram showing the relationship between 1/(sound speed)$^3$ and the attenuation factor for Example and Comparative Examples.

FIG. 22 shows the relationship between 1/(sound speed)$^3$ and the attenuation factor for porous silica materials produced by methods similar to Example 1, Comparative Example 1 and Comparative Example 5. As can be seen from FIG. 22, while the attenuation factor is generally in proportion to 1/(sound speed)$^3$ with porous silica materials produced by methods similar to Comparative Example 1 and Comparative Example 5, the attenuation factor is not in proportion to 1/(sound speed)$^3$ for the porous silica material produced by the method of Example 1. From the above, it can be inferred that while porous silica materials produced by methods similar to Comparative Example 1 and Comparative Example 5 have similar physical properties to those of known silica, the porous silica material produced by the method of Example 1 has different physical properties from those of known silica.

As shown in FIG. 21 and FIG. 22, with conventional porous silica materials, the attenuation factor increases as the sound speed decreases. That is, with conventional techniques, where one attempts to improve the characteristics of the acoustic device by decreasing the sound speed of the porous silica material, the attenuation of the sound wave may increase, thus decreasing the efficiency, in some cases. In contrast, with the porous silica materials of the present embodiment, the attenuation factor can be made smaller than those with conventional techniques even if the sound speed is low. Therefore, as will be described in the embodiment below, if the porous silica material of the present embodiment is used as the acoustic propagation medium in various acoustic devices such as optical microphones, it is possible to realize acoustic devices with a high sensitivity and a high efficiency.

Second Embodiment

Figure 23:
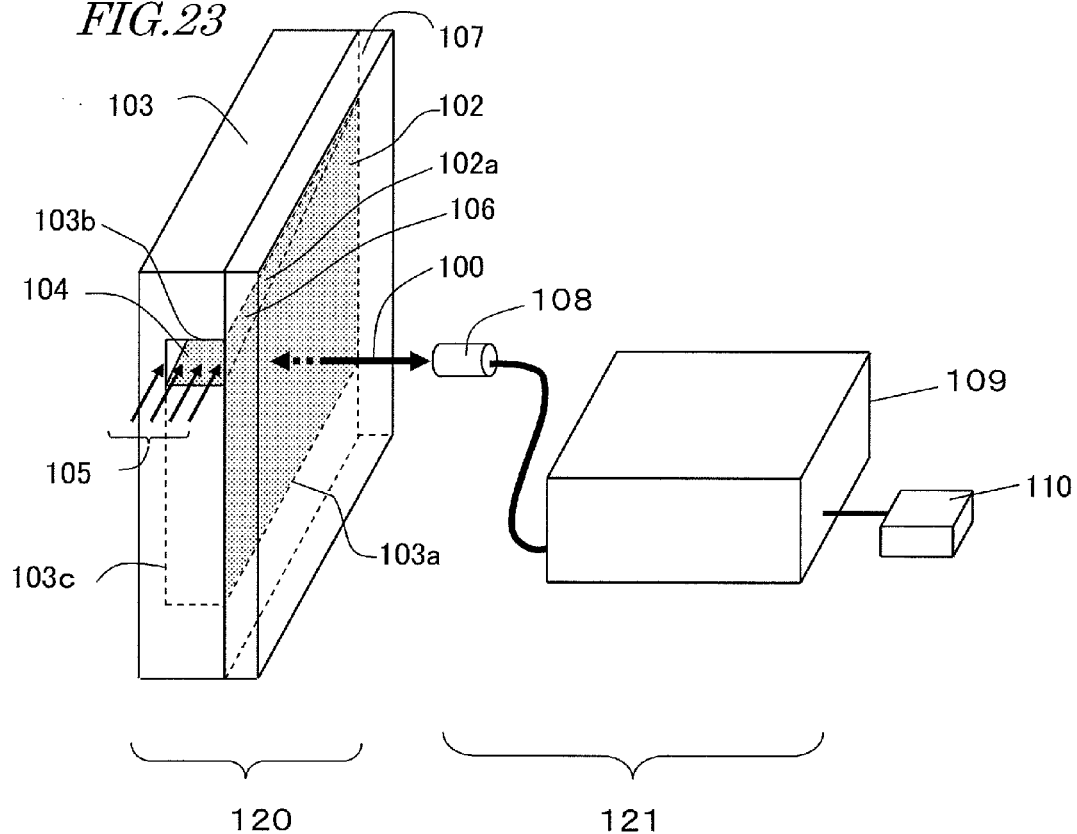
FIG. 23 is a diagram showing a configuration of an embodiment of the optical microphone.
Figure 24:
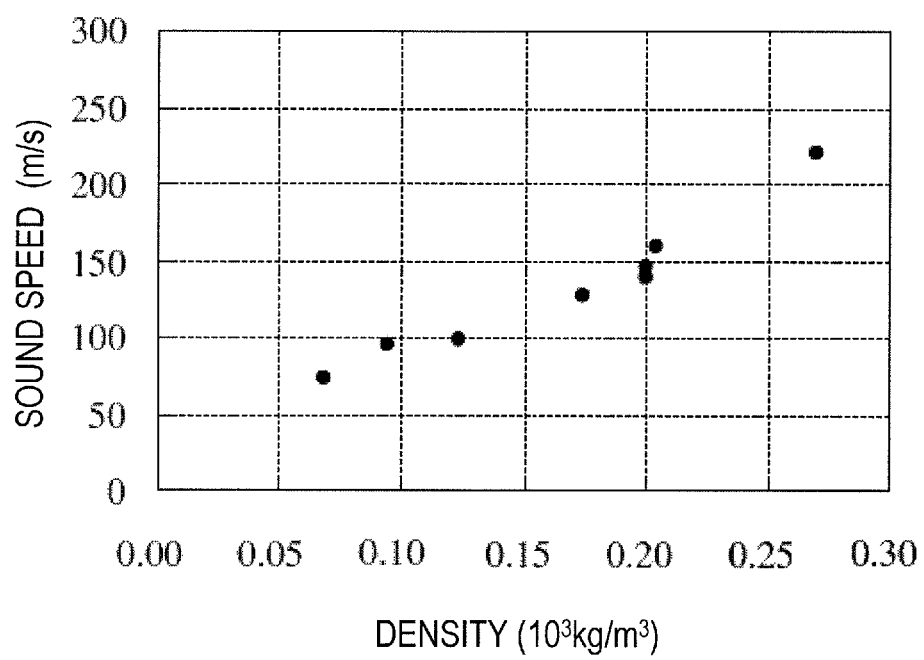
FIG. 24 is a diagram showing the relationship between the density and the sound speed for porous silica materials.

An embodiment of an optical microphone of the present invention will be described. FIG. 23 is a schematic diagram showing a configuration of the embodiment of the optical microphone. The optical microphone shown in FIG. 23 includes a reception section 120, a detection section 121, and a conversion section 110.

The reception section 120 receives a sound wave propagating through the space around the reception section 120, and converts the sound wave to variations in the optical properties. For this, the reception section 120 includes a base 103 having a depressed portion 103a, and a transparent support plate 107 supported so as to cover the opening of the depressed portion 103a. A photoacoustic propagation medium portion 102 made of the porous silica material of the first embodiment is arranged in the space formed by the depressed portion 103a of the base portion 103 and the transparent support plate 107. Also, the depressed portion 103a includes an acoustic waveguide 106, one surface of which is defined by a top surface 102a of the photoacoustic propagation medium portion 102. The base 103 includes an opening 104 for allowing the sound wave to enter the acoustic waveguide 106.

The detection section 121 detects, using light, the variations in the optical properties which have occurred in the reception section 120. Specifically, light having such a wavelength that it will pass through the porous silica material is output, and the light is allowed to pass through the photoacoustic propagation medium portion 102, with the sound wave propagating therethrough, so as to then detect light which has been modulated by the sound wave. The detection section 121 is a laser Doppler vibrometer (abbreviated as "LDV"), for example.

A sound wave having propagated through the air propagates from the opening 104 into the acoustic waveguide 106 along a sound wave propagation direction 105. As the sound wave propagates through the acoustic waveguide 106, the sound wave enters the porous silica material of the photoacoustic propagation medium portion 102 through the top surface 102a of the photoacoustic propagation medium portion 102, and propagates through the photoacoustic propagation medium portion 102.

A laser beam 100 output from the reception section 120 toward the photoacoustic propagation medium portion 102 passes through the transparent support plate 107 and the photoacoustic propagation medium portion 102 to be reflected at a bottom surface 103c of the depressed portion 103a of the base 103. The reflected laser beam 100 passes again through the photoacoustic propagation medium portion 102 and exits from the photoacoustic propagation medium portion 102 to be received by a head 108. When the laser beam 100 passes through the photoacoustic propagation medium portion 102, the density and the refractive index of the porous silica material of the photoacoustic propagation medium portion 102 vary due to the propagation of the sound wave therethrough, and the laser beam 100 is modulated by these variations.

The laser beam 100 received by the reception section 120 is converted to an electric signal and is then output to the detection section 121. The detection section 121 processes the electric signal to output, to the conversion section 110, a modulated component contained in the laser beam 100 as a detection signal. The conversion section 110 converts the detection signal to a sound pressure to output a received signal. The calculation in the conversion section 110 is as follows.

The volume V of the porous silica material of the photoacoustic propagation medium portion expands/shrinks due to the sound pressure of the sound wave propagating through the inside of the photoacoustic propagation medium portion 102, thereby causing a volume change ΔV. Due to the volume change ΔV, the refractive index n of a porous silica material changes by Δn. These relationships are represented by Expression (1).

[Expression 1]

$$\frac{\Delta V}{V} = -\frac{\Delta n}{n-1} \tag{1}$$

Since the sound wave is propagating through the inside of the porous silica material as an acoustic plane wave, the volume change ΔV is limited to displacement in the sound wave traveling direction; therefore, Expression (2) holds true.

[Expression 2]

$$\frac{\Delta V}{V} = -\frac{\Delta l}{l} = S \tag{2}$$

Herein, l is the length of the porous silica material in the sound wave propagation direction, Δl is the displacement in the sound wave propagation direction of the porous silica material due to the sound wave propagation therethrough, and S denotes the distortion of the porous silica material in the sound wave propagation direction. The sound pressure P inside the porous silica material can be represented by Expression (3) with the distortion S and the elastic constant E of the porous silica material.

[Expression 3]

$$P = -S \times E \tag{3}$$

The elastic constant E can be represented by Expression (4) using the density ρ and the sound speed C of the porous silica material.

[Expression 4]

$$E = C^2 \times \rho \qquad (4)$$

From Expressions (1) to (4), the sound pressure P of the inside of the porous silica material can be represented by Expression (5) using the density ρ, the sound speed C and the refractive index n of the porous silica material, and the displacement output ΔL, which is an electric signal output from the head 108, or the velocity output v, which is the output of a calculation section 109.

[Expression 5]

$$\begin{aligned} P &= -C^2 \times \rho \times \frac{\Delta n}{n-1} \\ &= -C^2 \times \rho \times \frac{n}{n-1} \cdot \frac{\Delta L}{L} \\ &= -C^2 \times \rho \times \frac{n}{n-1} \cdot \frac{1}{L} \int v \, dt \end{aligned} \qquad (5)$$

Therefore, using the velocity output v output from the calculation section 109, it is possible to measure the sound pressure P. From Expression (5), with the sound pressure P being constant, the smaller the density ρ and the sound speed C of the porous silica material are, the larger the displacement output ΔL is. That is, if the sound wave to be detected is constant, the smaller the density ρ and the sound speed C of the porous silica material are, the larger the displacement output ΔL is, and the higher the detection sensitivity of the optical microphone is.

Since the optical microphone of the present embodiment includes the porous silica material, which is the first embodiment, as the photoacoustic propagation medium portion, the sound speed of the photoacoustic propagation medium portion is low. Therefore, the change in the sound pressure occurring when the sound wave propagates through the photoacoustic propagation medium portion increases, and the amplitude of the output value also increases. The transmittance of the photoacoustic propagation medium portion is high. Therefore, the optical path length L can be made long. Thus, it is possible to detect the sound wave with a high sensitivity. Moreover, the porous silica material, which is the first embodiment, has a density similar to, and a sound speed lower than, those of conventional porous silica materials. Even if the sound speed is lowered, the attenuation factor does not increase. Therefore, it is possible to realize an optical microphone with a higher sensitivity and a higher efficiency than those of conventional techniques. Where a sensitivity similar to those of conventional techniques is to be realized, it is possible to use a porous silica material of a greater density than those of conventional techniques, whereby it is possible to realize an optical microphone that is easy to handle and has a high practical utility.

For example, the values of the velocity output v obtained by Expression (5) using the porous silica materials produced in Example 1 and Comparative Example 1 are compared with each other. As shown in Table 3, the porous silica materials of Example 1 and Comparative Example 1 have a similar density, it is believed that they have a similar refractive index n. The velocity output v is calculated using values of the density ρ and the sound speed C shown in Table 3, with the optical path length L and the sound pressure being constant. With the output of Comparative Example 1 being 1, the output of Example 1 is 1.26, indicating an increase of 26% in the output value and an improvement to the sensitivity.

While a laser Doppler vibrometer is used as the detection section 121 in the present embodiment, a modulated component contained in light may be detected by using other detection devices, e.g., a laser interferometer, or the like, for detecting optical variations occurring in the photoacoustic propagation medium portion as it passes through the photoacoustic propagation medium portion. The structure of the reception section is not limited to the structure shown in FIG. 23.

The porous silica material of the embodiment of the present invention is suitably used as an acoustic propagation medium of various acoustic devices and photoacoustic devices. Particularly, it is useful as a photoacoustic propagation medium of an optical microphone, or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A porous silica material in which silica particles are connected to one another three-dimensionally, wherein:
   the porous silica material includes a through hole including first pores smaller than 50 nm, and second pores larger than the first pores;
   the porous silica material has a density of 100 kg/m³ or more and 300 kg/m³ or less; and
   two isobutyl groups are bound to silicon of silica of the silica particles.

2. The porous silica material according to claim 1, wherein the porous silica material does not contain methoxy.

3. An optical microphone comprising:
   a reception section including a photoacoustic propagation medium portion formed by the porous silica material according to claim 1, wherein a sound wave enters the reception section from a space around the reception section and propagates through the photoacoustic propagation medium portion;
   a detection section for outputting light of a wavelength that passes through the porous silica material and the light passes through the photoacoustic propagation medium portion through which the sound wave is being propagated so as to detect the light which has been modulated by the sound wave, thereby outputting a detection signal; and
   a conversion section for converting the detection signal to a sound pressure to output a received signal.

4. A method for manufacturing a porous silica material comprising the steps of:
   mixing tetramethoxysilane and diisobutyldimethoxysilane together in a solvent to obtain a sol;
   adding water to the sol and holding the sol for a predetermined period of time to obtain a gel; and
   removing the solvent from the gel to dry the gel.

5. The method for manufacturing a porous silica material according to claim 4, wherein in the step of obtaining the gel, the tetramethoxysilane and the diisobutyldimethoxysilane are mixed together at a mass ratio of 1:0.4 or more and 1:1 or less.

\* \* \* \* \*